United States Patent
Arita et al.

(10) Patent No.: US 10,300,525 B2
(45) Date of Patent: May 28, 2019

(54) MOLTEN METAL FILTRATION DEVICE

(71) Applicant: Mitsui Mining & Smelting Co., Ltd., Tokyo (JP)

(72) Inventors: Takeo Arita, Fukuoka (JP); Minoru Kubota, Fukuoka (JP); Kazuhiko Kawaguchi, Fukuoka (JP); Eiki Tsutsumi, Fukuoka (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 86 days.

(21) Appl. No.: 15/327,487

(22) PCT Filed: Jul. 24, 2015

(86) PCT No.: PCT/JP2015/071162
§ 371 (c)(1),
(2) Date: Jan. 19, 2017

(87) PCT Pub. No.: WO2016/017557
PCT Pub. Date: Feb. 4, 2016

(65) Prior Publication Data
US 2017/0252797 A1 Sep. 7, 2017

(30) Foreign Application Priority Data

Jul. 28, 2014 (JP) .................................. 2014-152857
Mar. 27, 2015 (JP) .................................. 2015-066193

(51) Int. Cl.
B22C 9/08 (2006.01)
C22B 21/06 (2006.01)
(Continued)

(52) U.S. Cl.
CPC ............ *B22C 9/086* (2013.01); *B22D 43/004* (2013.01); *C22B 9/02* (2013.01); *C22B 9/023* (2013.01); *C22B 21/066* (2013.01); *Y02P 10/234* (2015.11)

(58) Field of Classification Search
CPC ....... B22C 9/086; C22B 21/066; C22B 9/023; C22B 9/02; B22D 43/004
(Continued)

(56) References Cited

U.S. PATENT DOCUMENTS 3,524,548 A * 8/1970 McDonald ......... B01D 39/2075
210/153
3,747,765 A * 7/1973 Nowak ................. B01D 29/111
210/238

FOREIGN PATENT DOCUMENTS

JP 05-140660 6/1993
JP 05-195101 8/1993
(Continued)

OTHER PUBLICATIONS

English machine translation version JP2013136812, Tatsumi et al., molten metal filtration apparatus, Jul. 11, 2013, 12 pages (Year: 2013).*
(Continued)

*Primary Examiner* — Scott R Kastler
*Assistant Examiner* — Michael Aboagye
(74) *Attorney, Agent, or Firm* — Young & Thompson

(57) ABSTRACT

This filtration device 10 has a can body 20 having a reservoir 3 that connects to an opening 9 at the top, and a filtration unit 40 which is detachably installed in the reservoir. The filtration unit has a support plate 42, and filtration tubes 41 of bottomed cylindrical shape fastened to the support plate. The side wall 22 of the can body 20 has a protruding locking part 30 for installation of the filtration unit so that the filtration (Continued)

tubes are suspended from the support plate 42, with the openings 43 thereof facing upward. With the support plate 42 locked into the locking part 30, pressing members 70 for pressing the support plate 42 downward from the upper surface side in sections thereof lying towards the peripheral edge S in relation to the fastening locations of the filtration tubes 41 are deployed, making it possible for the support plate 42 to be fastened in clamped fashion by the locking part 30 and the pressing members 70.

15 Claims, 23 Drawing Sheets

(51) Int. Cl.
*C22B 9/02* (2006.01)
*B22D 43/00* (2006.01)

(58) Field of Classification Search
USPC .................................. 266/227, 229, 230, 232
See application file for complete search history.

(56) References Cited

FOREIGN PATENT DOCUMENTS

| | | | | |
|---|---|---|---|---|
| JP | 07-335243 | 12/1995 | | |
| JP | 09-137235 | 5/1997 | | |
| JP | 2001-059748 | 3/2001 | | |
| JP | 3137233 | 10/2007 | | |
| JP | 2013-136812 | 7/2013 | | |
| JP | 2013136812 | * | 7/2013 | ............. B22C 9/086 |

OTHER PUBLICATIONS

International Search Report, PCT/JP2015/071162, dated Oct. 27, 2015.

* cited by examiner

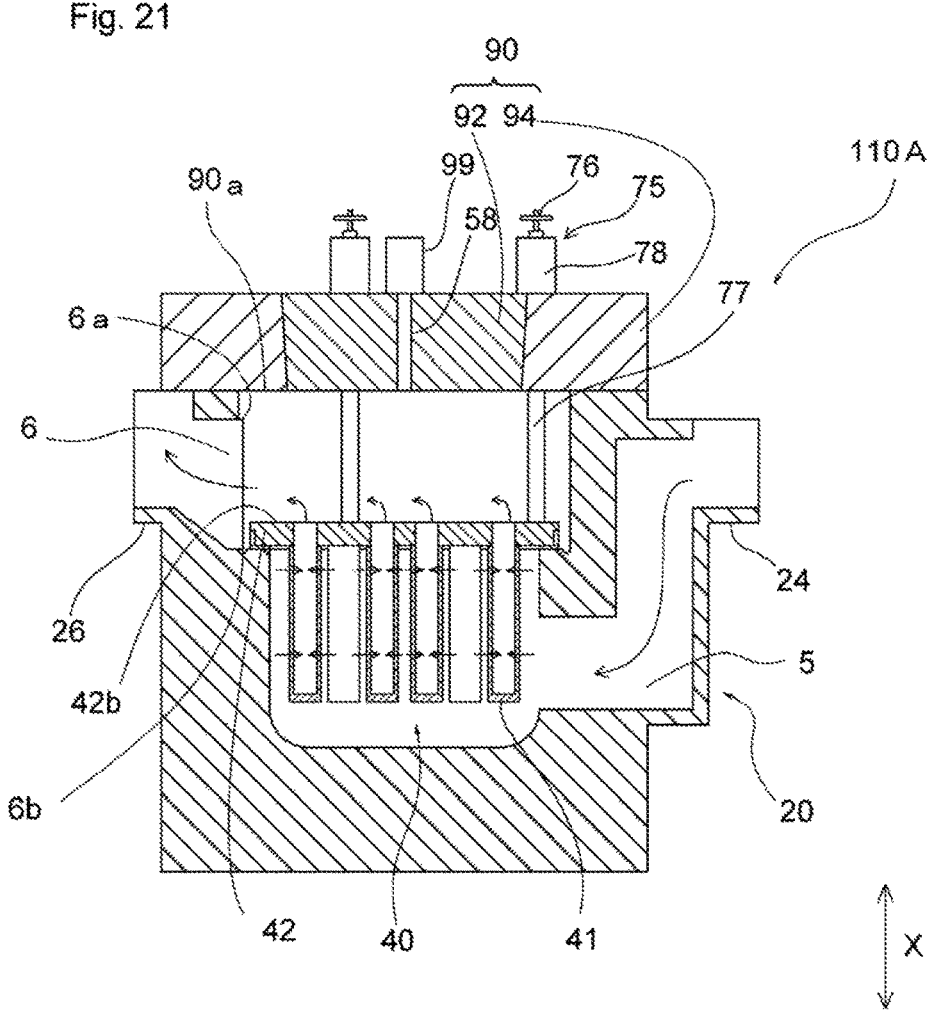

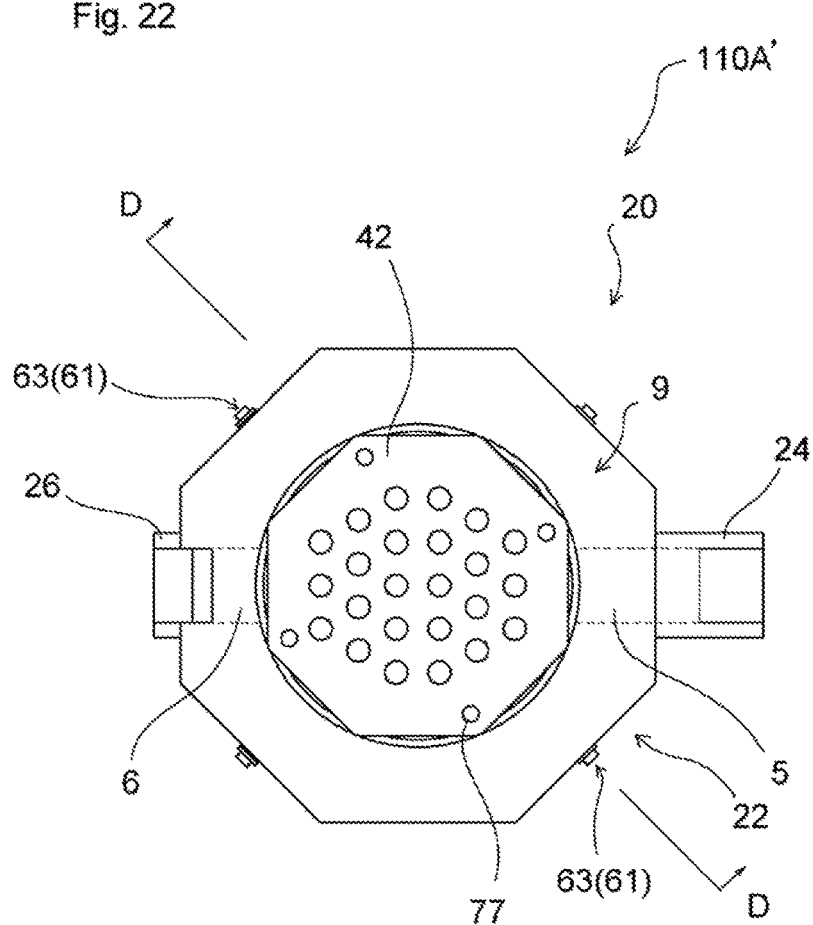

MOLTEN METAL FILTRATION DEVICE

TECHNICAL FIELD

This invention relates to a molten metal filtration apparatus for removing inclusions and the like from various molten metals, such as aluminum and aluminum alloys.

BACKGROUND ART

Inclusions and the like in molten metal containing aluminum, an aluminum alloy, and so on cause problems in casting, such as casting defects, and cracking of the resulting casting in rolling. Therefore, filtration of molten metal has been practiced to remove inclusions and the like. A filtration apparatus having one or more porous ceramic filtration tubes placed horizontally in a molten metal chamber is widely known. In a filtration apparatus of this type molten metal is made to flow from the outside to the inside of the tube to be deprived of inclusions, etc. and gain improved quality. Castings obtained from, for example, molten aluminum thus filtered have reduced cracking or scratches on rolling. Examples of such a filtration apparatus are described in Patent Literatures 1 and 2 below.

FIG. 24 schematically illustrates the structure of such a conventional filtration apparatus 210. The filtration apparatus 210 includes a housing 220 and a filtration unit 240. The filtration unit 240 includes a filtration tube 241 having its both ends supported by a pair of support plates 242 (called closure heads). The filtration unit 240 is pressed to the inner wall of the housing 220 by a wedge 290 thereby to secure a seal for molten metal. The pair of support plates 242 are supported by respective bases 230.

The assignee common to this patent application previously proposed a filtration apparatus having filtration tubes disposed in a molten metal chamber not horizontally but vertically (see Patent Literature 3 below). The embodiment shown in FIGS. 1 to 3 in Patent Literature 3 is configured in such a manner that, when the filtration unit is fitted into the housing, the longitudinal direction of the filtration tubes intersects the horizontal direction of the housing and their open end face upward.

CITATION LIST

Patent Literature

Patent Literature 1: JP 5-195101A
Patent Literature 2: JP 9-137235A
Patent Literature 3: JP 2013-136812A

SUMMARY OF INVENTION

Technical Problem

In the case of a filtration system having filtration tubes 241 disposed horizontally as with the case of the filtration apparatus 210 shown in FIG. 24, molten metal tends to deposit and solidify on the base 230 with long-term use of the system, resulting in making a slight difference in height of the base 230 at the ends of the filtration tubes. That being the case, when the filtration unit 240 is pressed by the wedge 290 onto the inside wall of the housing 220, the contact pressure of the support plate 242 with the base 230 varies between the facing pair of the support plates 242. Consequently, the sealability of the filtration unit 240 reduces, which can lead to molten metal leakage. Once molten metal leakage occurs, non-filtered molten metal will be incorporated into filtered molten metal, and the whole molten metal flowing in the filtration system must be re-treated. Such re-treatment demands time and effort, causing a heavy loss.

In the case of the filtration system of Patent Literature 3 having filtration tubes disposed vertically, molten metal enters the filtration tubes from the outside toward the inside of the filtration tube, flows upward in the tubes, overflows from the open end of each tube, and flows outside the system. If the molten metal upward flow lifts the support plate to which the filtration tubes are fixed, the molten metal can leak. To avoid this, Patent Literature 3 proposes providing the support plate with a weight and the like.

However, the filtration apparatus of Patent Literature 3 still has room for improvement on the prevention of the support plate from being lifted more effectively.

An object of the invention is to provide a molten metal filtration apparatus that eliminates the above discussed various disadvantages associated with conventional techniques.

Solution to Problem

The present invention provides a molten metal filtration apparatus including:
  a housing having an opening in its upper portion and a molten metal chamber and
  a filtration unit detachably fitted in the molten metal chamber of the housing,
  the filtration unit including a support plate and at least one bottomed cylindrical filtration tube which is made of a porous ceramic material and is fixed to the support plate along the thickness direction of the support plate,
  with the filtration unit being fitted in the housing, the filtration tube being configured in such a manner that the longitudinal direction of the filtration tube intersects the horizontal direction of the housing and the open end of the filtration tube faces upward,
  the housing having, on its inner wall, a catching portion for fitting the support plate therein, the catching portion projecting horizontally inward from the inner wall,
  the apparatus having a hold-down member holding down the support plate from the upper surface toward the lower side of the support plate at a location closer to the periphery of the support plate than the location at which the filtration tube is fixed, and
  the catching portion and the hold-down member being configured to hold the support plate therebetween under pressure.

Advantageous Effects of Invention

The molten metal filtration system according to the invention easily allows for sealing the filtration unit and effectively prevents lift of the support plate and resultant leakage of molten metal.

BRIEF DESCRIPTION OF DRAWINGS

FIG. 5(a) and FIG. 5(b) are each a perspective view of the filtration unit 40 shown in FIG. 1 viewed from below a support plate 42, of which FIG. 5(a) represents the state non-engaged by a fitting tool, and FIG. 5(b) represents the state engaged by a fitting tool.

FIG. 21 is a cut-away end view of the apparatus 110A fitted with a second closure in place of the heating unit, taken along line C-C of FIG. 20.

FIG. 22 is equivalent to FIG. 20, illustrating a filtration apparatus 110A' having an engageable member for fixing a closure 90 to the housing 20 in right position.

FIG. 23(a) and FIG. 23(b) are each a cut-away end view of the apparatus 110A' fitted with a second closure in place of the heating unit, taken along line D-D of FIG. 22 viewed in the direction of the arrows, of which FIG. 23(a) depicts the upper portion of the filtration apparatus 110A', and FIG. 23(b) is an enlarged fragmentary view of FIG. 23(a).

DESCRIPTION OF EMBODIMENTS

Figure 1:
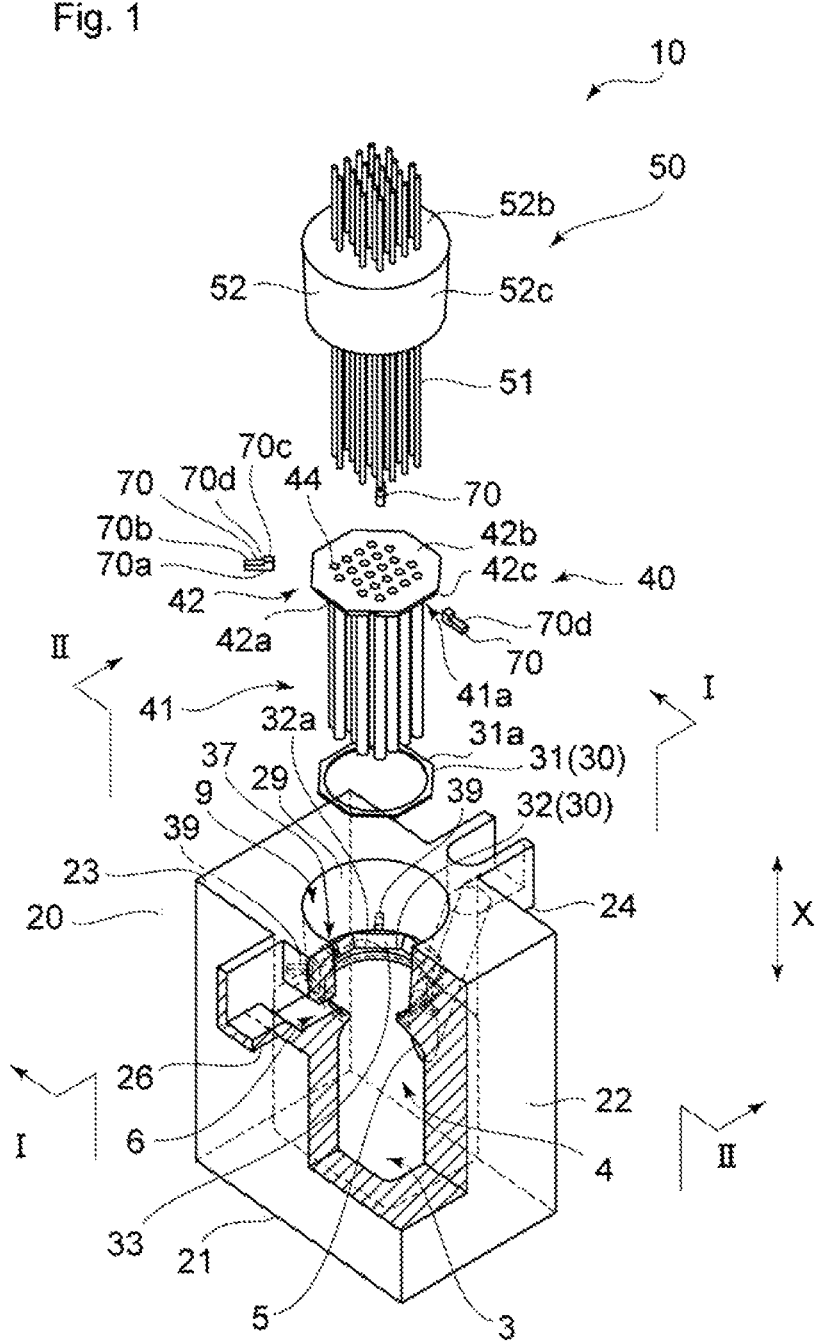
FIG. 1 is an exploded perspective view of a molten metal filtration apparatus 10 according to an embodiment of the invention, with part of the housing 20 broken away.
Figure 2:
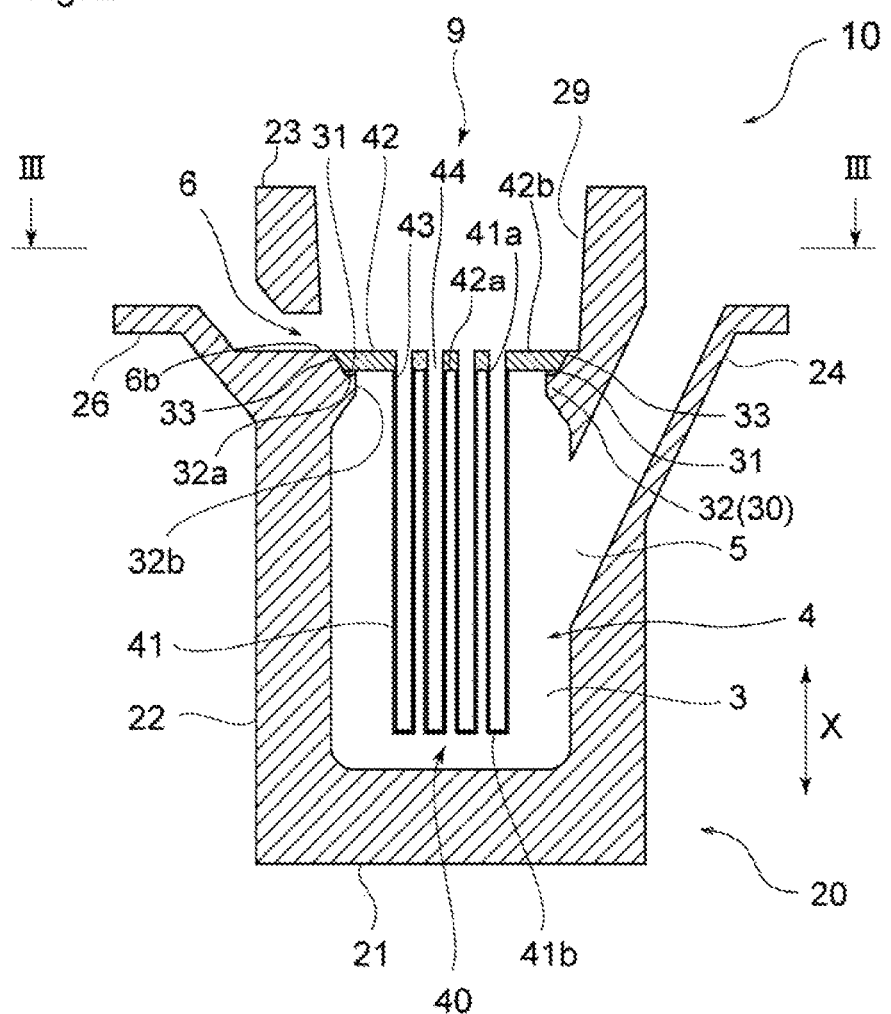
FIG. 2 is a cut-away end view of the apparatus 10 after fitting a filtration unit 40 and before fitting a closure 52 (a heating unit 50) or a closure 92, taken along line I-I of FIG. 1 viewed in the direction of the arrows.
Figure 3:
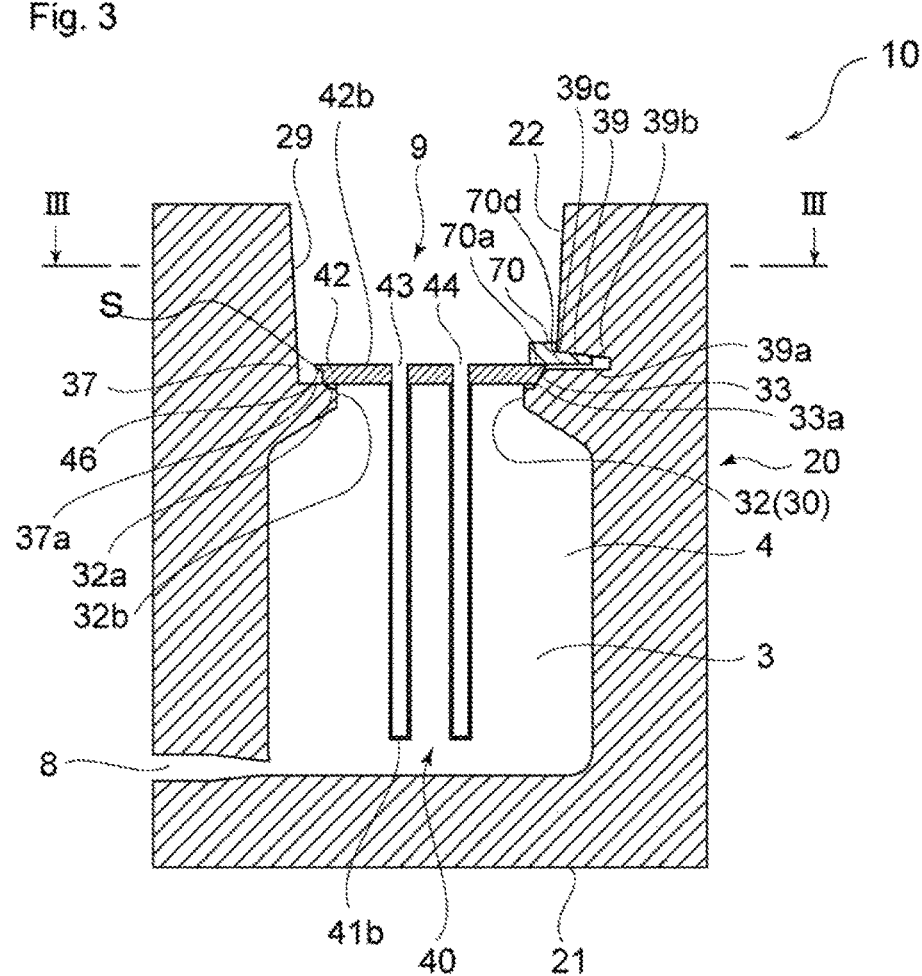
FIG. 3 is a cut-away end view of the apparatus 10 in the same state as in FIG. 2, taken along line II-II of FIG. 1 viewed in the direction of the arrows.

The invention will be described on the basis of preferred embodiments thereof with reference to the accompanying drawings. FIG. 1 is an exploded perspective view illustrating an embodiment of the molten metal filtration apparatus (hereinafter simply referred to as "filtration apparatus" or more simply "apparatus"). As illustrated in FIG. 1, the filtration apparatus 10 includes a housing 20 in which molten metal is retained and a filtration unit 40. The housing 20 has an opening (a space) 9 (also called a housing opening 9) in the upper portion thereof. The filtration unit 40 includes a support plate 42 and at least one bottomed cylindrical filtration tube 41 which is made of a porous ceramic material and is fixed to the support plate 42 along the thickness direction of the support plate 42. As illustrated in FIGS. 2 and 3, the filtration unit 40 is detachably fitted into the housing 20 through the housing opening 9. The housing opening 9 is blockable by a closure 52 or 92 described below. The housing 20 includes an outer casing made of metal (e.g., iron) and a refractory liner.

The filtration apparatus 10 in the state before being fitted with the closure 52 or 92 (i.e., before being fitted with a heating unit 50) will be described by way of FIGS. 1 through 7. FIGS. 2 through 7 each illustrate the apparatus 10 in that state. In FIGS. 1 and 2, the depth direction of the housing 20 is indicated by arrow X. As used hereunder, the terms "horizontal plane" and "horizontal direction" mean a plane perpendicular to the depth direction X and a direction perpendicular to the depth direction X, respectively.

Figure 4:
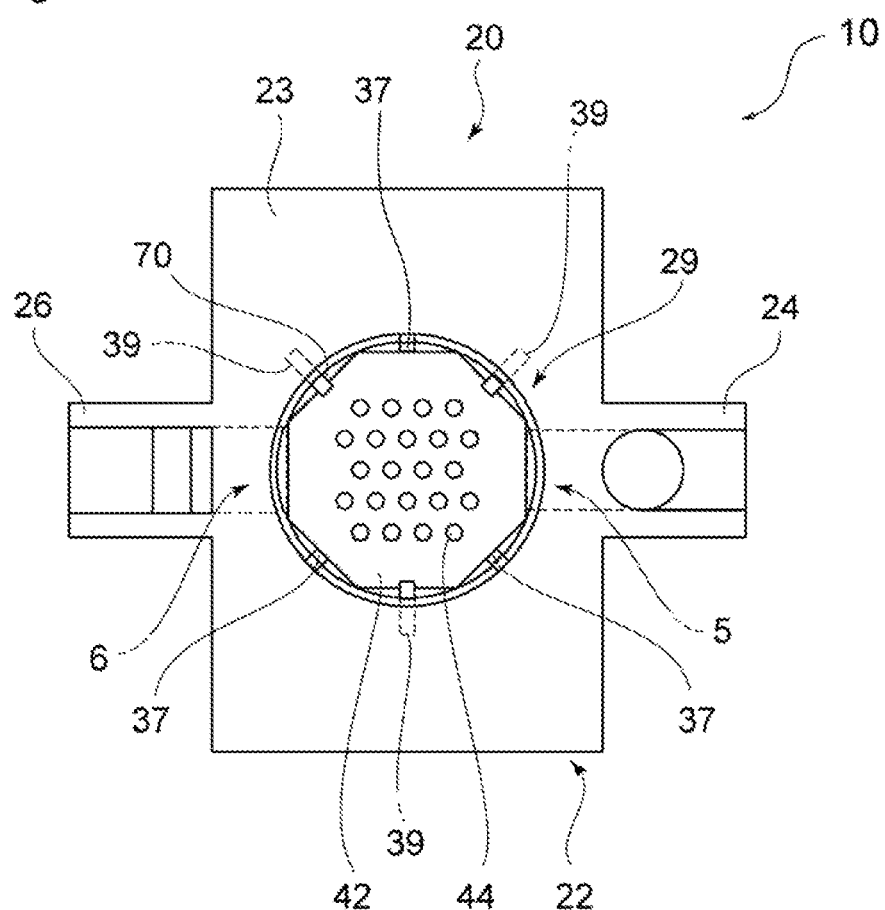
FIG. 4 is a cross-sectional view of the apparatus 10 in the same state as in FIGS. 2 and 3, taken along line III-III of FIGS. 2 and 3 viewed in the direction of the arrows.

The housing 20 illustrated in FIG. 1 has a box shape with its top open and is formed of a bottom 21 of a rectangular plan view shape and a wall 22 upright from the four sides of the bottom. As illustrated in FIGS. 1, 4, etc., the bottom 21 is substantially oblong rectangular in a plan view. The upper end of the wall 22 is a flat surface parallel to the bottom 21, forming the top 23 of the housing 20. The housing opening 9 is made through the top 23.

As illustrated in FIGS. 1 to 3, the housing 20 has an internal space 4 defined by the bottom 21 and the wall 22. The internal space 4 has, in the bottom (21) side, a chamber 3 for retaining molten metal and is open upward to provide the housing opening 9. The chamber 3 is substantially rectangular in plan view, specifically substantially rectangular oblong in the same direction as the bottom 21. The chamber 3 is configured to house the filtration unit 40 therein. In carrying out molten metal filtration, the chamber 3 is filled with molten metal.

As illustrated in FIGS. 1, 2, and 4, the rectangular wall 22 surrounding the chamber 3 has a molten metal inlet 5 (hereinafter simply "inlet 5") through which molten metal to be filtered is poured into the chamber 3. The inlet 5 is provided with a chute 24. The molten metal to be filtered is guided by the chute 24 and poured through the inlet 5 into the chamber 3. The wall 22 also has a molten metal outlet 6 (hereinafter simply "outlet 6"), and the inlet 5 and the outlet 6 are opposite to each other with respect to the opening 9 and the chamber 3. In a plan view, the mutually facing direction of the inlet 5 and the outlet 6 corresponds to the direction in which the short side of the bottom 21 extends, and the direction perpendicular to the mutually facing direction corresponds to the long side.

The housing 20 has a hole 8 going through the wall 22 near the bottom 21 (see FIG. 3). The hole 8 is for the withdrawal of the molten metal remaining in the chamber 3 after completion of the molten metal filtration operation.

As illustrated in FIGS. 1, 2, 4, etc., the wall 22 of the bottom 20 has the outlet 6 through which filtered molten metal is discharged. As illustrated in FIG. 2, the outlet 6 is located so as to lead to the opening 43 of the filtration tube 41 when the filtration unit 40 is housed in the housing 20. The outlet 6 leads to the housing opening 9 with its lower end 6b substantially even with the upper surface 42b of the support plate 42 of the filtration unit 40 fitted in the housing 20. The outlet 6 is connected to a discharge gutter 26. As illustrated in FIG. 4, the outlet 6 is located to face the inlet 5 in plan view with the chamber 3 and the housing opening 9 therebetween. Note that the positional relationship of the inlet 5 and the outlet 6 is not limited to the one illustrated. Molten metal filtered by the filtration unit 40 described below is discharged out of the filtration apparatus 10 from the outlet 6 through the gutter 26 and transferred to the next step.

As shown in FIGS. 1 to 3, etc., the housing 20 has a catching portion 30 which projects horizontally inward from the wall 22 and which is for catching the support plate 42 of the filtration unit 40 when the unit 40 is lowered to be fitted in the housing 20. The catching portion 30 is located above the chamber 3 and at the lower end of the housing opening 9. It is preferred for the housing 20 and the catching portion 30 be an integrally formed ceramic body.

In the example illustrated in FIG. 1, etc., the housing 20 has a projection 32 projecting horizontally and internally from the inner surface of the wall 22 defining the housing opening 9. The projection 32 constructs the catching portion 30. The projection 32 is continuous in the inner circumferential direction of the housing opening 9 and has a virtually flat upper surface 32a. In the example of FIG. 1, etc., the projection 32 has an annular form along the whole inner circumference of the housing opening 9. Because of the provision of the catching portion 30, the internal space 4 has a decreasing width in a part thereof between the bottom 21 and the housing opening 9 upwardly when viewed in a direction perpendicular to the depth direction X.

As illustrated in FIGS. 2 and 3, the upper surface 32a of the projection 32 is a flat surface substantially perpendicular to the depth direction X. On the upper surface 32a is placed packing 31. The projection 32 catches, on its upper surface 32a via the packing 31, the lower surface 42a of the support plate 42 of the filtration unit 40 described below. The packing 31 is made of a material having heat resistance and sealing capabilities, for example, heat-insulating fibers such as fibrous alumina or fibrous alumina silica.

Even if metal deposits on the upper surface 32a of the projection 32 (catching portion 30), the position of the upper surface 32a in the depth direction X can be prevented from changing by timely removing the deposited metal. In this regard, the upper surface 32a preferably has a coated surface so that deposited and solidified molten metal may easily be removed therefrom. For example, in the case when the filtration apparatus 10 is used to filter aluminum or an aluminum alloy, the upper surface 32a may be coated with a ceramic material having poor wettability with molten aluminum, such as alumina, boron nitride, silicon nitride, or zirconia. With the coated surface, the projection 32 easily maintains a good seal against the filtration unit 40 for a long time of use of the apparatus 10. When the coated upper surface 32a catches the support plate 42 of the filtration unit 40 via the packing 31, it is possible to hold the support plate 42 under pressure between the upper surface 32a (via the packing 31) and a hereinafter described wedge 70 inserted into a hereinafter described recess 39 thereby to keep the support plate 42 at a fixed position in the depth direction X.

It is preferred that such a coating be also applied to a hereinafter described edge-mating portion 33 and the recess 39.

As shown in FIGS. 2 and 3, the projection 32 has, at the end thereof, an end surface 32b, which is substantially vertical to the horizontal plane. With the filtration unit 40 fitted in the housing 20, the end surface 32b surrounds the lateral side of the filtration tubes 41. The end surface 32b of the projection 32 substantially makes a circle in plan view. The shape defined by the end surface 32b is not limited to a circle and may be a generally polygonal shape, for example, a generally octagonal shape similar to the shape of the support plate 42 of the filtration unit 40.

As shown in FIGS. 1 to 3, the wall 22 has, on its inner surface, on and above the projection 32, an edge-mating portion 33 shaped in a complementary fashion to the edge surface 42c of the support plate 42.

Here, the shape of the support plate 42 of the filtration unit 40 will be described. As illustrated in FIGS. 1 to 3, etc., the support plate 42 of the filtration unit 40 has a first main surface 42a facing downward when the filtration unit 40 is being fitted in the housing 20 (hereinafter also called a lower surface 42a) and a second main surface 42b located opposite to the lower surface 42a (hereinafter also called an upper surface 42b). The lower surface 42a and the upper surface 42b are substantially parallel to each other. When viewed from the side, the support plate 42 of the filtration unit 40 has a fittable configuration to be fitted in along the direction from the opening 43 side toward the lower end 41b side of the filtration tube 41, i.e., in the direction from the upper surface 42b toward the lower surface 42a of the support plate 42. When the support plate 42 is described as having a fittable configuration along the direction from the opening 43 side toward the lower end 41b side of the filtration tube 41 in a side view, it is meant that, when the support plate is viewed in a direction parallel to its main surface, it has a smaller horizontal dimension (a dimension in a direction parallel to the main surface of the support plate 42) on its lower surface 42a than on its upper surface 42b. Preferably, the horizontal dimension of the support plate 42 decreases from the upper surface 42b side toward the lower surface 42a side (in the direction from the opening 43 toward the lower end 41b). Such a configuration may be an either continuously or discontinuously tapered configuration or a shouldered configuration.

When the support plate 42 is described as having a fittable configuration as viewed in a direction, the shape of the support plate 42 may be such that the horizontal dimension does not decrease from the opening 43 side toward the lower end 41b side when viewed in another direction. Such a configuration may be a shape a projected planform of which is not larger than the shape of the upper surface 42b, such as a shape the opposite ends of which seen in a side view are vertical to the main surfaces of the support plate 42 (the opposite ends both extend vertically from the opening 43 side toward the lower end 41a side.

The support plate 42 may have only a part thereof configured to be fitted in, such as tapered or shouldered, in a side view. For example, in the case where the support plate 42 has a generally polygonal plan view shape, not all the edge surfaces should be tapered or shouldered. That is, some of the edge surfaces may not be tapered nor shouldered. A tapered or shouldered edge surface does not always have to be tapered or shouldered over its entire area and may be tapered or shouldered in only a part thereof, e.g., a lower or an upper portion thereof.

The support plate 42 used in the example illustrated in FIGS. 1 to 7, etc. is configured to be fitted in from the upper surface 42b side toward the lower surface 42a side when viewed in every direction parallel to the horizontal plane. In FIGS. 2 and 3, all the edge surfaces 42c of the support plate 42 of the filtration unit 40 have an inwardly tapered surface inclined from the upper surface 42b side to the lower surface 42a side, so that the edge surfaces 42c of the support plate 42 have a tapered surface over substantially the entire area thereof. While the support plate 42 of the embodiment has a generally polygonal plan-view shape, specifically a generally octagonal plan-view shape (see FIG. 4), the shape of the support plate 42 is not limited thereto.

As viewed from the side, the edge-mating portion 33 of the wall 22 has an increasing inner distance in a direction from the bottom 21 to the top 23 of the wall 22 in conformity to the above described edge profile of the edge surface of the support plate 42. That is, in the example illustrated in FIG. 2, the edge-mating portion 33 of the wall 22 has a surface reverse-tapered in a direction from the bottom 21 to the top 23 (inclined outwardly of the housing 20) complementarily to the tapered surface of the edge surface 42c of the support plate 42. Since the support plate 42 of the embodiment has a tapered surface on substantially the entire area of its edge surface as stated above, the edge-mating portion 33 of the wall 22 has a reverse-tapered surface inclined outwardly of the housing 20 in the direction from the bottom 21 to the top 23 on substantially the entire area of its surface mating the edge surface of the support plate 42 so that the support plate 42 and the edge-mating portion 33 may snugly fit to each other.

As illustrated in FIGS. 1, 3, 7, etc., the wall 22 has recesses 39 bored on substantially the same horizontal plane, the recesses 39 each extending horizontally outward from the inner surface of the wall 22. The plurality of recesses 39 are formed along the inner circumference of the housing opening 9. As illustrated in FIGS. 3 and 7, the position of the recesses 39 in the depth direction of the housing 20 is almost the same as that of the upper surface 42b of the support plate 42 of the filtration unit 40 as fitted on the catching portion 30.

As illustrated in FIGS. 3 and 7, the recess 39 has a bottom inner surface 39a along the horizontal plane of the housing 20. It is preferred that the bottom inner surface 39a be positioned lower than the upper surface 42b of the support plate 42 fitted on the catching portion 30 for the following reason. Molten metal can deposit on the bottom inner surface 39a of the recess 39. In such a case, if the bottom inner surface 39a is positioned on the same level as the upper surface 42b of the support plate 42, there can remain solidified aluminum at a position higher than the upper surface 42b, and the above discussed catching mechanism may fail to function.

In the example illustrated in FIGS. 3, 7(a), 7(b), etc., the recess 39 has the bottom inner surface 39a that is substantially parallel with the horizontal plane and a top inner surface 39b having a tapered surface that slopes outwardly downward and, as a whole, is configured to be fitted with a hereinafter described wedge 70. The number of the recesses 39 formed in the wall 22 is preferably at least two, more preferably three or more, in order to prevent the support plate 42 from being lifted. There are three recesses 39 in the embodiment illustrated in FIG. 4. For the same purpose, it is preferred that at least one recess 39 be formed to extend in a direction perpendicular to the mutually facing direction of the inlet 5 and the outlet 6 in a plan view of the housing 20. In the case where the support plate 42 has a generally polygonal plan-view shape, the recess 39 may be formed at a position facing a vertex of the polygon but is preferably provided at a position facing a side of the polygon, more preferably at substantially the midpoint between adjacent vertices.

As illustrated in FIG. 1, etc., the filtration apparatus 10 has at least one wedge 70 inserted and fitted into the recess 39. The wedge 70 has a rod shape longer in the direction of insertion into the recess 39 and has its width (a dimension in the depth direction X in the state fitted into the recess 39) decreasing toward its leading end to be inserted into the recess 39. In the example shown in FIG. 1, etc., the wedge 70 as inserted into the recess 39 has a downwardly facing lower surface 70a that is substantially horizontally flat and a tapered upper surface 70b inclined downward (toward the side of the lower surface 70a) in the direction of insertion into the recess 39. The wedge 70 has an upward projection 70c in its tailing end opposite to the leading end, the upward projection 70c projecting opposite to the lower surface 70a. As illustrated in FIG. 1, an edge surface of the projection 70c and the upper surface 70b meet to make a concave corner 70d. As illustrated in FIG. 3, etc., the part of the wall 22 that defines the housing opening 9 and the top inner surface 39b of the recess 39 meet to make a convex corner 39c. As illustrated in FIG. 3, etc., the concave corner 70d and the convex corner 39c are complementary to each other when viewed from the side in a direction parallel to the horizontal plane and perpendicular to the direction of inserting the wedge 70 into the recess 39. The wedge 70 is configured in such a manner that, with the convex corner 70d of the wedge 70 in contact with the concave corner 39c of the recess 39, the lower surface 70a is substantially even with the upper surface 42b of the support plate 42. As illustrated in FIG. 4, both the recess 39 and the wedge 70 inserted into the recess 39 have substantially a rectangular plan view shape, but the shape of them is not limited the one illustrated. The wedge 70 may be made of, for example, a ceramic material containing at least one of silicon carbide, silicon nitride, and zirconia. A silicon nitride-bonded silicon carbide refractory material is particularly suitable. The preferred number of the wedges 70 is the same as for the recesses 39.

As illustrated in FIG. 1, the housing 20 has a closure-receiving portion 29 above the projection 32 and the edge-mating portion 33. The closure-receiving portion 29 forms an opening going through the depth direction with a generally circular plan-view shape. The closure-receiving portion 29 is open in substantially the center of the top 23 and defines the housing opening 9 together with the projection 32 and the edge-mating portion 33. The housing opening 9 (specifically the closure-receiving portion 29) is complementary to a hereinafter described closure 52 or 92.

Figure 6:
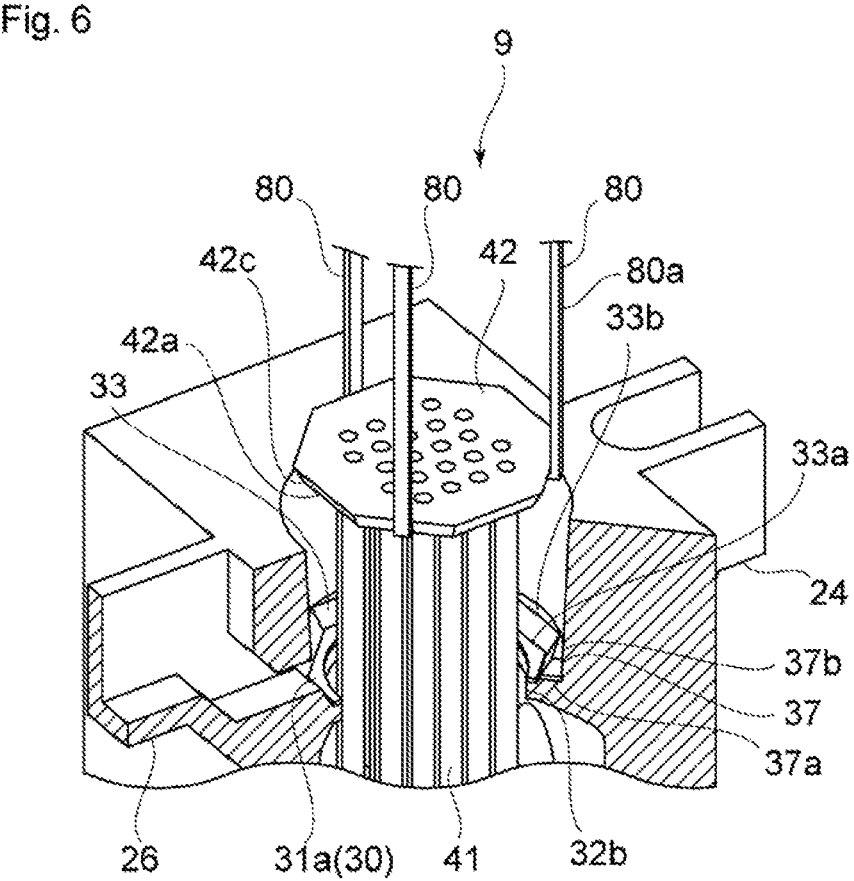
FIG. 6 is a perspective view of the apparatus 10 of which the filtration unit 40 is being fitted in the housing 20, with part of the housing cut away.

As illustrated in FIGS. 1, 3, 6, and 7, the edge-mating portion 33 of the housing 20 has a groove 37 for easily guiding a fitting tool to the catching portion 30 for housing the filtration unit 40 into the housing 20. The groove 37 is a recess open to the internal space of the housing 20, which is formed by recessing a circumferential part of the edge-mating portion 33 of the housing opening 9 from the edge-mating side toward the external of the housing 20. As illustrated in FIG. 6, the groove 37 is formed by boring the edge-mating portion 33 (specifically a circumferential part of the edge-mating portion 33) from its upper surface 33b down to substantially the lower end of the edge-mating portion 33 in the depth direction X. As illustrated in FIGS. 3, 7(c), etc., the level of the bottom (lower surface) 37a of the groove 37 is preferably even with or above the lower end 33a of the edge-mating portion 33 to ensure prevention of reduction in sealing performance between the support plate 42 and the housing 20. As shown in FIGS. 1, 3, 6, and 7, it is preferred that the groove 37 not be formed on the closure-receiving portion 29 that is located above the edge-mating portion 33 in order to block the housing 20 by the closure 52 or 92 with a tight seal. The groove 37 has an end 37b (bottom portion of groove) facing inward of the housing 20. While in FIGS. 3, 6, and 7 the end 37b of the groove 37 is substantially even with the inner periphery of the closure-receiving portion 29, the position of the end 37b is not limited thereto. The groove 37 may be formed so that its end 37b is external to the inner periphery of the closure-receiving portion 29 with respect to the radial direction of the housing 20 (the radial direction of the housing opening 9 in plan view). The end 37b of the groove 37 may be inclined similarly to the inner periphery of the closure-receiving portion 29 which is tapered downward, or may be vertical to the horizontal plane in side view. The width, length (distance from the end 37b to the opposite end), and the like of the groove 37 are subject to variation according the configuration of the fitting tool.

As illustrated in FIG. 4, the groove 37 is one of grooves 37 provided at an interval in the circumferential direction of the housing opening 9. In order to facilitate stably holding and transferring the filtration unit 40 by the fitting tool, it is preferred to make at least two, more preferably three or more, grooves 37 on the wall 22. There are three grooves 37 in the example shown in FIG. 4. The groove 37 serves to guide a hooking member of the fitting tool engaging the support plate 42 to the catching portion 30 where the support plate 42 is to be located. Therefore, the wall 22 usually has as many grooves 37 as hereinafter described hook-engageable cuts 46 of the support plate 42, in which the hooking member of the fitting tool is configured to engage, at positions mating the hook-engageable cuts 46. As illustrated in FIG. 4, an adequate number of the grooves 37 and an adequate number of the recesses 39 can be arranged with ease by providing every groove 37 between adjacent recesses 39 in the circumferential direction of the housing opening 9.

The filtration unit 40 to be fitted in the housing 20 will then be described in detail. As illustrated in FIGS. 1 and 2, the support plate 42 of the filtration unit 40 is made of a ceramic material hardly reactive with molten metal. The filtration tube 41 is made of a porous ceramic material having pores allowing for passage and filtration of molten metal. As illustrated in FIGS. 2 and 3, the filtration tube 41 is a bottomed cylinder with one end 41a open (having an opening 43) and the other end 41b closed, which is configured to allow molten metal to penetrate from the outside into the inside of the tube 41 and to make the molten metal having penetrated into the inside of the tube 41 flow out from the opening 43. While the filtration tube 41 generally has an annular shape in a transverse cross-section as in the example shown in FIG. 1, etc., the filtration tube 41 of the present embodiment is not limited to such a configuration.

The filtration tube 41 is made of a refractory material having low reactivity with molten metal to be treated. In treating molten metal containing aluminum or an aluminum alloy, the filtration tube 41 may be made of silicon carbide ceramics, silicon nitride ceramics, alumina ceramics, zirconia ceramics, and so forth. Filtration tubes made of alumina ceramics are preferred taking into consideration elution of a ceramic component into molten aluminum and in terms of filtration tube production ease and cost reduction.

As illustrated in FIGS. 1 to 4, etc., the support plate 42 has a plurality of openings 44 going through its thickness. In the filtration unit 40, each filtration tube 41 is fixed to the support plate 42 along the thickness direction of the plate 42. More specifically, each filtration tube 41 is affixed to the support plate 42 on its open end 41a (i.e., the end 41a having the opening 43) with its longitudinal direction substantially perpendicular to the main surface of the support plate 42. Accordingly, the filtration tube 41 sticks out from only the lower surface 42a of the support plate 42. The location at which each filtration tube 41 is affixed to the support plate 42 corresponds to the position of the opening 44 of the support plate 42 in a plan view of the filtration unit 40. Therefore, when the filtration unit 40 is viewed from the upper surface 42b side of the support plate 42b, the opening 44 of the support plate 42 and the hollow of the filtration tube 41 interconnect to each other. The filtration tube 41 may be fixed to the support plate 42 using, for example, ceramic cement, such as alumina cement.

The filtration unit 40 can be fitted into the housing 20 usually by bringing down the filtration unit 40 through the housing opening 9 using a fitting tool external to the filtration apparatus 10. Various types of transfer equipment may be used as a fitting tool. For example, a lifting and lowering device, such as a hoist, is conveniently used. The support plate 42 has a hook-engageable cut 46 in which the hooking members 80 of the fitting tool engage.

As illustrated in FIGS. 3 and 5, the hook-engageable cut 46 of the support plate 42 of the embodiment is formed by boring a part of the peripheral edge portion S of the support plate 42 except a part containing the upper surface 42b of the support plate 42. As used herein, the term "boring a part of the peripheral edge portion except a portion containing the upper surface 42b" is intended to mean that the hook-engageable cut 46 may be formed either one of or both of a part of the edge surface 42c and a part of the lower surface 42a of the support plate 42. To improve a seal between the support plate 42 and the housing 20, the cut is preferably made on only the edge surface 42c but not on the lower surface 42a of the support plate 42, or the cut on the lower surface 42a is preferably as small as possible. Accordingly, the hook-engageable cut 46 is preferably a recess bored radially inwardly on the edge surface 42c at a location other than the upper surface 42b of the support plate 42. The hook-engageable cut 46 may be formed by, for example, counterboring. The hook-engageable cut 46 is located radially distal to the openings 44 in plan view.

Figure 5A:
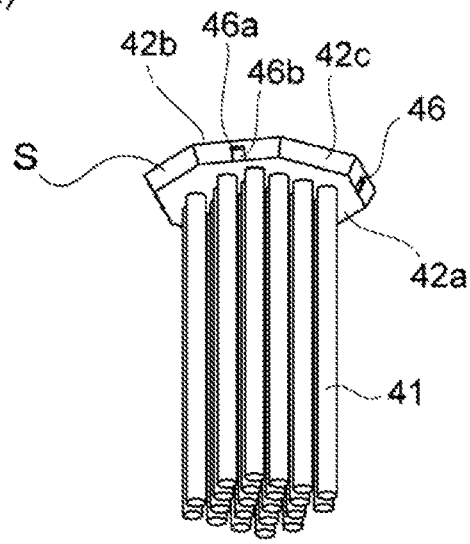

In the example illustrated in FIG. 5(a), each hook-engageable cut 46 has a top inner surface 46a facing down (toward the lower end 41b of the filtration tube 41) and an end surface 46b facing laterally outward of the support plate 42 and is configured to allow the hooking member 80 to engage on the top inner surface 46a. However, the shape of the hook-engageable cut 46 is not limited to the example shown. For example, the hook-engageable cut 46 may be a longer-than-wide recess extending inward from the edge surface 42c of the support plate 42 as long as it does not interconnect to any opening 44. The top inner surface 46a of the hook-engageable cut 46 may or may not be substantially parallel to the support plate 42. For example, the top inner surface 46a may be inclined upwardly (toward the upper surface 42b of the support plate) from the edge surface 42c to the end surface 461), or the top inner surface 46a may have a part thereof recessed upwardly (toward the upper surface 42b of the support plate). The end surface 46b may or may not be a vertical surface which is vertical to the radial direction of the support plate 42. For example, the end surface 46b may be a tapered surface which is inclined laterally outwardly from the upper surface (42b) side toward the lower surface (42a) side, or the end surface 46b may be shouldered or curved.

The hook-engageable cut 46 is provided along the peripheral edge portion S of the support plate 42. It is usually preferred that at least two, more preferably three or more, hook-engageable cuts be provided similarly to the grooves 37 of the housing 20. There are three hook-engageable cuts 46 in the example shown in FIGS. 3 to 5, etc. In the case where the support plate 42 has a generally polygonal plan-view shape, each hook-engageable cut 46 may be formed at the vertex of the polygon but is preferably between adjacent vertices, more preferably at substantially the midpoint of a side between adjacent vertices. While the hook-engageable cut 46 is provided on the tapered edge surface 42c of the support plate 42 in the example shown in FIGS. 3 to 5, etc., when only part of the edge surface 42 is tapered or shouldered, the part of the edge surface 42 on which the hook-engageable cut 46 is formed may or may not be tapered or shouldered.

In what follows, the assembling sequence of fitting the filtration unit 40 into the housing 20 by means of a fitting tool will be described with reference to FIGS. 5 to 7.

Figure 5B:
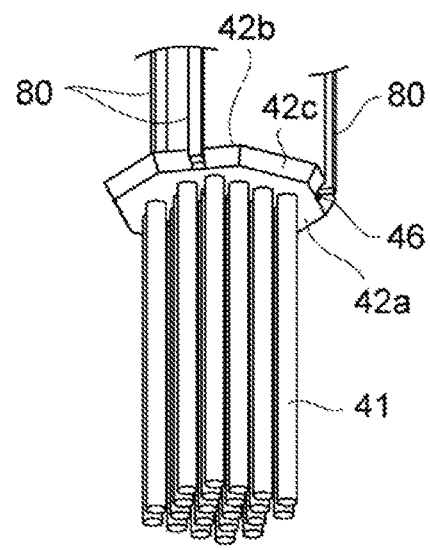

As illustrated in FIG. 5(b), each hooking member 80 of a fitting tool, such as a hoist crane, engages in each hook-engageable cut 46 of the support plate 42 with the filtration tubes 41 hanging downward in the depth direction X. By the engagement between the hooking members 80 and the hook-engageable cuts 46, the filtration unit 40 is transported with its support plate 42 held stably.

As illustrated in FIG. 6, the hooking members 80 of the fitting tool holding the filtration unit 40 are located above the grooves 37. In this state, the filtration unit 40 is moved down in the housing opening 9. As previously stated, since the grooves 37 are provided at positions corresponding to the hook-engageable cuts 46, the hooking members 80 of the fitting tool engaging in the hook-engageable cuts 46 are allowed to move down in the grooves 37 without being obstructed by the edge-mating portion 33 of the housing 20 (e.g., without contacting the edge-mating portion 33) thereby to lower the support plate 42 stably and smoothly.

Since the edge surface 42 of the support plate 42 has a liftable configuration, and the wall 22 of the housing 20 has, above the catching portion 30, the edge-mating portion 33 complementary to the edge surface 42 as described supra, the lowering support plate 42 is easily brought into register with the edge-mating portion 33. Thus, as illustrated in FIG. 7(a), at the time when the support plate 42 reaches the catching portion 30, the support plate 42 is easily and stably mounted on the catching portion 30 with the support plate 42 snugly fitted to the complementary edge-mating portion 33 of the wall 22. The filtration apparatus 10 according to the present embodiment can thus be assembled easily by fitting the filtration unit 40 at a right position of the housing 20 without requiring computer-aided precise alignment.

Figure 7A:
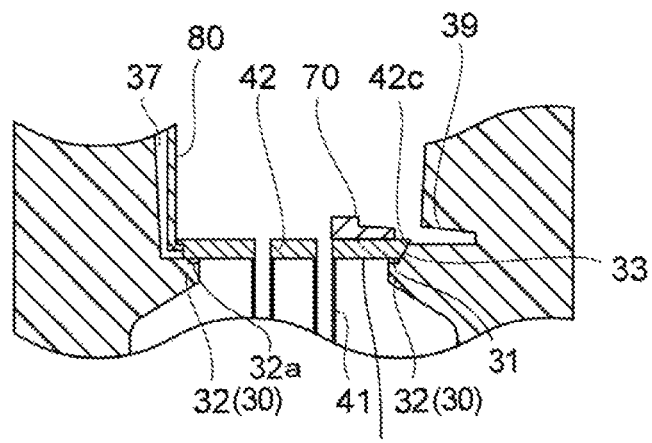
FIG. 7(a), FIG. 7(b), and FIG. 7(c) are partially enlarged end views corresponding to FIG. 3, illustrating the assembly sequence from fitting the filtration unit 40 into the housing 20 to insertion of a wedge 70 into a recess 39 in the order of (a), (b), and (c).

As illustrated in FIG. 7(a), the support plate 42 contacts with and is mounted on the catching portion 30 (specifically, the upper surface 32a of the projection 32) via the packing 31 on its lower surface 42a of the peripheral edge portion S that is radially outward of the positions where the filtration tubes 41 are fixed, whereupon the support plate 42 is caught by the catching portion 30 and is prevented from further lowering. The filtration unit 40 is thus housed in the housing 20, is suspended inside the housing 20. To secure a seal between the edge surface 42c of the support plate 42 and the edge surface of the edge-mating portion 33, it is preferred that the edge surface 42c of the support plate 42 and the edge surface of the edge-mating portion 33 be in contact with each other over their entire surface except the portions having the grooves 37.

All the filtration tubes 41 of the filtration unit 40 as housed in the housing 20 have their longitudinal direction coinciding with the same direction intersecting the horizontal plane of the housing 20 and their openings 43 facing upward. In the embodiment, each filtration tube 41 hangs down from the support plate 42 in the depth direction in the molten metal chamber 3 (see FIGS. 2 and 3). In such a suspended fashion, the filtration unit 40 is disposed in the housing 20 with its two main surfaces 42a and 42b substantially coincide with the horizontal plane.

A liquid-tight seal is achieved between the filtration unit 40 and the housing 20 by the packing 31 disposed on the upper surface of the projection 32. The seal is achieved by the self-weight of the suspended filtration unit 40.

In the conventional filtration apparatus 210, the seal of the filtration unit 240 is achieved by using a pair of support plates. In contrast, the filtration apparatus 10 achieves a seal using only one support plate 42. Therefore, even in long-term use of the apparatus 10, the contact condition between the support plate 42 and the catching portion 30 is easily kept uniform. Consequently, the sealing properties between the filtration unit 40 and the housing 20 hardly reduce even in long-term use of the apparatus 10. In particular, since the catching portion 30 extends the whole inner circumference of the housing opening 9, the support plate 42 is caught by a single member (catching portion 30), so that occurrence of slip between members will be avoided effectively. Since the housing 20 and the catching portion 30 are integrally formed of a ceramic material, a slip or displacement of the catching portion 30 in the housing 20 never occurs even in long-term use of the apparatus 10. Therefore, the engagement of the support plate 42 and the catching portion 30 is maintained properly and easily for a long period of use.

Figure 7B:
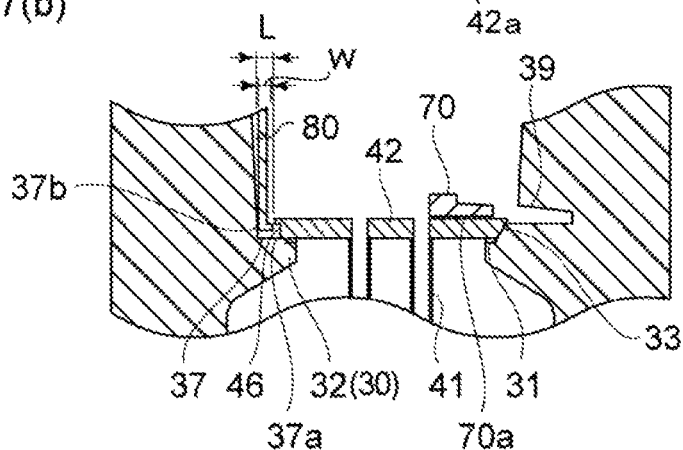

As illustrated in FIG. 7(b), the distance L in the horizontal direction between the end 37b of the groove 37 and the support plate 42 as fitted in the housing 20 is longer than the width W of the leading end of the hooking member 80 in the same direction when the apparatus 10 is viewed from the side. Therefore, the hooking member 80 can easily be moved upward along the end 37b of the groove 37 to be taken out of the housing opening 9 as illustrated in FIGS. 7(b) and 7(c).

Figure 7C:
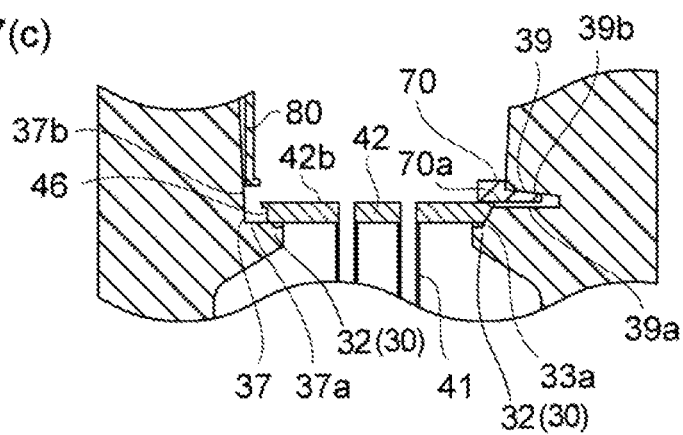

After the support plate 42 is fitted on the catching portion 30, the wedge 70 is inserted in the recess 39 formed on the inner side of the wall 22 as illustrated in FIG. 7(c). As described earlier, the recess 39 is formed on a level substantially even with the upper surface 42b of the support plate 42 as fitted on the catching portion 30 in the depth direction. The support plate 42 of the filtration unit 40 is thus held under pressure between the wedge 70 inserted in the recess 39 and the catching portion 30 (specifically, the projection 32 via the packing 31). Specifically, a part of the support plate 42 that is in contact with the catching portion 30 and located in the peripheral edge portion S radially outward of the positions where the filtration tubes 41 are fixed is held under pressure between the catching portion 30 and a hold-down member, i.e., the wedge 70 inserted in the recess 39. Because the wedge 70 thus holds down the upper surface 42b of the support plate 42, the filtration unit 40 is effectively prevented from being lifted by the ascending force of molten metal flow at the commencement of filtration. Because the support plate 42 is held down under pressure not on its central portion but on a part of its peripheral edge portion S, it is prevented from breaking. As previously described, since the wedge 70 decrease its width, the position of the support plate 42 in the depth direction X can finely be adjusted with ease by adjusting the extent of insertion of the wedge 70 into the recess 39. By the use of a plurality of wedges 70, the peripheral edge portion S of the support plate 42 is pressed uniformly thereby to provide an increased seal of the support plate 42.

As described, since the bottom inner surface 39a of the recess 39 is located below the support plate 42 caught by the catching portion 30, the lower surface 70a of the wedge 70 inserted into the recess 39 is out of contact with the bottom inner surface 39a of the recess 39 as illustrated in FIGS. 3 and 7(c). Thus, even if molten metal deposits on the bottom inner surface 39a, the support plate hold-down mechanism by the wedge 70 continues functioning effectively.

The mechanism for preventing lift of the filtration unit 40 including the recesses 39 and the wedges 70 according to the embodiment easily works continuously even in an environment liable to involve deposition of molten metal and therefore provides the advantage of easy maintenance of the apparatus. For example, even when molten metal enters the recess 39 having the wedge 70 fitted in and solidifies there, the recess 39 may easily be cleared off by applying to the recess 39 the same coating as applied to the upper surface 32a of the projection 32. Even when molten metal deposits on the wedge 70, it is easy to replace the wedge 70. According to the embodiment, there is no need to provide a hold-down mechanism that pierces the closure 52 or 92 to prevent lift of the support plate 42. This allows for relatively free structural design of the closure.

In this regard, the filtration apparatus described in Patent Literature 3 adopts a weight 45 disposed on the support plate 42 as a lift preventive mechanism in the embodiment in which the opening of filtration tubes faces upward. However, the lift preventive action by the weight 45 is insufficient in some cases.

As described above, the filtration apparatus 10 of the embodiment includes the housing 20 having the opening 9 in its upper portion and the filtration unit 40 fitted in the housing 20. The filtration unit 40 includes at least one bottomed cylindrical filtration tube 41 made of a porous ceramic material, the filtration tube 41 being fixed with its longitudinal direction intersecting the horizontal direction of the housing 20 and with its open end upward. The apparatus 10 further includes an additional structure described below.

The filtration apparatus 10 includes a heating unit 50 detachably fitted to the filtration unit 40. The heating unit 50 includes a support 52 and at least one heater 51 fixed to the support 52. The heater 51 is fixed to the support 52 at such a position as to be inserted in the filtration tube 41. Because the filtration tube is heated from its inside by the heater 51 inserted therein, efficient heating is achieved, and the time for preheating the filtration tube is shortened.

Figure 8:
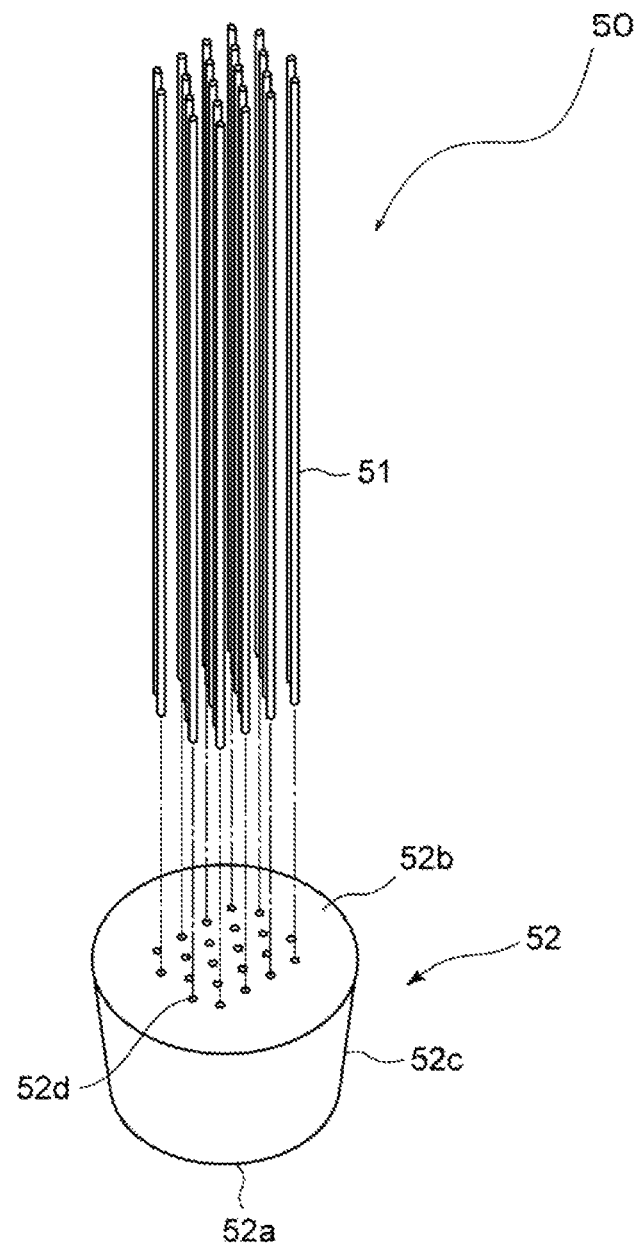
FIG. 8 is an exploded perspective view of a heating unit 50 shown in FIG. 1.
Figure 9:
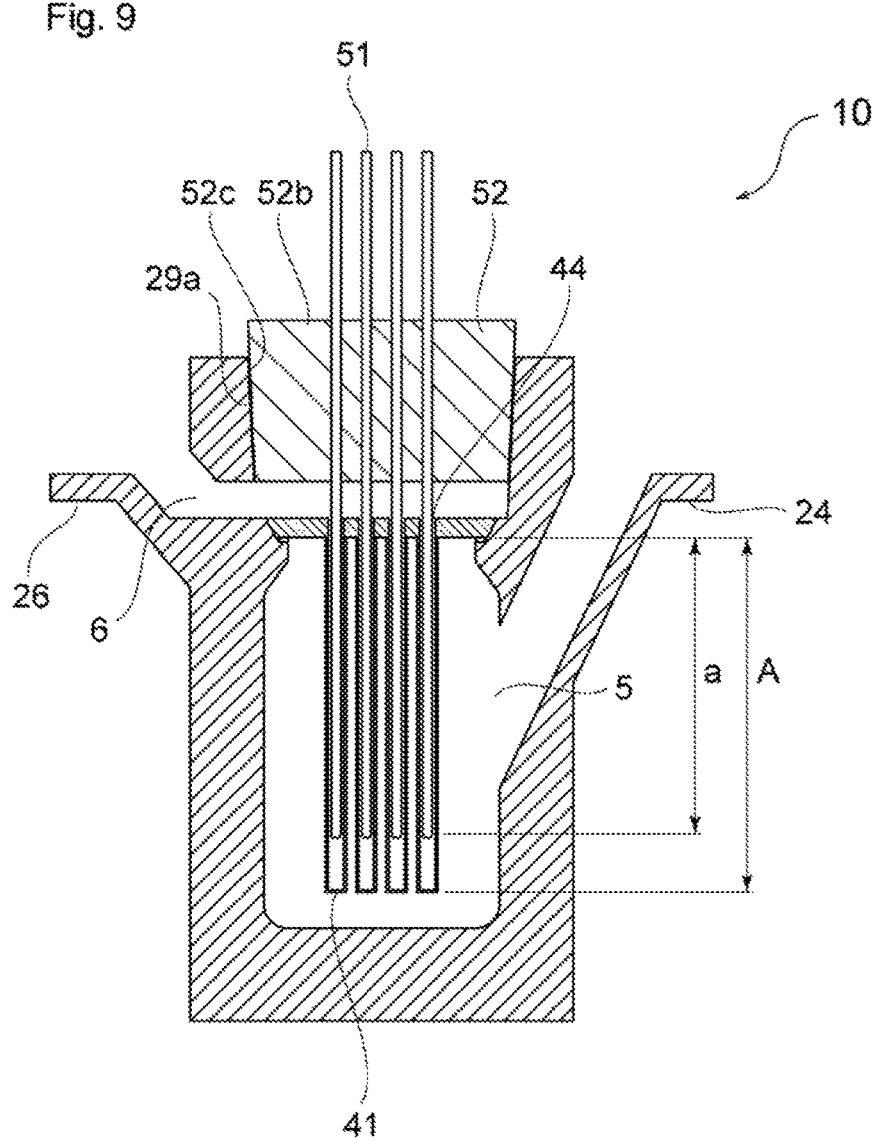
FIG. 9 is equivalent to FIG. 2, illustrating the apparatus 10 fitted with the closure 52.

The heating unit 50 is fittable to the filtration tube 41 of the filtration unit 40 housed in the housing 20. As illustrated in FIGS. 1, 8, and 9, the heating unit 50 has a plurality of heaters 51 fixedly supported by the support 52. The number of the heaters 51 is preferably the same as the number of the filtration tubes 41. Provided that the number of the heaters 51 is at least one, it may be smaller than the number of the filtration tubes 41 when, for example, the requisite heating temperature is not so high.

The support 52 has a first closure 52 configured to fit in with the housing opening 9 to block the opening 9. The first closure 52 has at least one heater 51 fixed therethrough. In the embodiment, the first closure 52 and the heater 51 constitute the heating unit 50 that is detachably fitted to the filtration unit 40. As the support 52 fits in the housing opening 9, the heating unit 50 is fixed to the filtration unit 40. In the embodiment, upon closing the housing opening 9 with the first closure 52, which is the support 52, the heater 51 is inserted in the filtration tube 41, whereby the heating unit 50 is fitted to the filtration unit 40.

As illustrated in FIG. 8, the heater 51 has a length and a cross-sectional shape capable of heating the filtration tube 41 along the longitudinal direction of the tube 41. The heater 51 used in the embodiment is rod-shape, specifically a generally columnar shape. Materials that can make the heater 51 include, but are not limited to, silicon carbide heating elements and metallic heating elements. The cross-sectional shape of the heater 51 is such that allows the heater 51 to be inserted through the opening 44 of the support plate 42 and the opening 43 of the filtration tube 41. For example, comparing the cross-sections of the heater 51 and the filtration tube 41 taken along a plane perpendicular to their longitudinal direction, it is preferred for at least the part of the heater 51 that is inserted in the filtration tube 41 to have a cross-section the maximum length of which is smaller than the diameter of the inscribed circle of each of the two openings 43 and 44. As used herein, the term "maximum length" of a cross-section denotes the maximum distance between two points on the perimeter of the cross-section. As for a heater 51 having a generally columnar shape, the maximum length is the diameter of its cross-section. When the openings 43 and 44 are circular, the diameter of their inscribed circle is the inner diameter of these circular openings. The heater 51 may have a constant or varied cross-sectional shape, taken along a plane perpendicular to its longitudinal direction, over the whole length thereof. For example, the heater 51 may have a decreasing cross-sectional area toward its leading tip to be inserted in the filtration tube 41.

As illustrated in FIGS. 1, 8, and 9, the support 52 of the heating unit 50 as fitted to the filtration tube 41 has a lower surface 52a facing down in the depth direction X, an upper surface 52b facing up in the depth direction X, and a lateral surface 52c located between the upper surface 52a and the lower surface 52b. The upper surface 52a and the lower surface 52b are substantially parallel with each other. The lateral surface 52c of the support 52 preferably has a tapered surface which is inclined inwardly from the upper surface 52c to the lower surface 52b. That is, as illustrated in FIG. 9, when viewed from at least one direction parallel to the horizontal direction, it is preferred for the support 52 of the heating unit 50 fitted to the filtration tube 41 to have its width gradually decreasing downward in the depth direction X. The support 52 used in the embodiment decrease its width downward on its entire lateral side as viewed from every direction parallel to the horizontal direction. The angle between the tapered lateral surface 52c and the upper surface 52b of the support 52 may be either constant or varied when viewed from a plurality of directions parallel to the horizontal direction as long as the tapered lateral surface 52c is fittable to the inner surface of the housing opening 9 (closure-receiving portion 29).

The heater 51 is fixed to the support 52 to stick out downward from the lower surface 52a of the support 52. As illustrated in FIG. 8, the support 52 has as many through-holes 52d as the heaters 51. Each through-hole 52d has a cross-sectional shape allowing for insertion and fixation of the heater 51. The through-hole 52d goes through the support 52 in the direction substantially perpendicular to the upper surface 52b and lower surface 52a of the support 52. The number of the through-holes 52d is the same as that of the heaters 51. In plan view, positions of each through-hole 52 of the support 52 are corresponding to positions of each filtration tube 41 of the support plate 42. The heater 51 is fixed to the support 52 as passed through the through-hole 52d. The heater 51 may be fixed to the support 52 using, for example, ceramic cement, such as alumina cement. The heater 51 as fixed to the support 52 has its longitudinal direction substantially perpendicular to the upper surface 52b and the lower surface 52a of the support 52. The closure 52 preferably includes a member made of an alumina castable from the standpoint of heat resistance and cost. For example, the heater 51 may be fixed in place to the support 52 using an unshown jig in order to prevent the heater 51 from dropping more securely.

The heating unit 50 is fixed to the filtration tube 41 of the filtration unit 40 housed in the housing 20 as follows. The heating unit 50 is placed above the housing opening 9 in such a manner that the upper and the lower surface 52b and 52a of the support 52 are substantially perpendicular to the depth direction and the position of the heater 51 substantially corresponds to the position of the opening 44 of the support plate 42 and the opening 43 of the filtration tube 41 in plan view. In this state, the heating unit 50 is lowered in the depth direction X, whereby the heater 51 is inserted into the filtration tube 41 through the opening 44 of the support plate 42 and the opening 43 of the filtration tube 41. In the embodiment, it is possible to insert the heater 51 into the filtration tube 41 with the direction of insertion, the longitudinal direction of the heater 51, and the longitudinal direction of the filtration tube 41 substantially coincident with each other. When the heating unit 50 is described as being "fitted to" the filtration unit 40 or the filtration tube 41 in the embodiment, it is meant that the heater 51 is inserted in the filtration tube 41. As illustrated in FIG. 9, the number of the heaters 51 of the heating unit 40 is preferably equal to or less than the number of the filtration tubes 41, and every filtration tube 41 has the heater 51 inserted therein.

As illustrated in FIG. 9, the support (closure) 52 being lowered in the depth direction X is fitted to the closure-receiving portion 29 of the housing opening 9 of the housing 20, whereby the heating unit 50 is fixed to be kept at a given position with respect to the filtration unit 40. As previously described, the lateral surface 52c of the support 52 has a tapered surface, and the inner surface 29a of the part of the wall 22 that forms the closure-receiving portion 29 is shaped complementary to the lateral surface 52c. Therefore, as the heating unit 50 moves downward in the depth direction X, the lateral surface 52c of the support 52 comes into contact with the inner surface 29a of the closure-receiving portion 29 in the housing opening 9 as shown in FIG. 9. Further lowering of the support 52 in the direction X is thereby stopped and, at the same time, the support 52 blocks up the housing opening 9 to complete the function as a first closure. By fixing the heating unit 50 with respect to the filtration unit 40 in the manner described, it is possible to insert the heater 51 into the filtration tube 41 to a certain degree so that the leading tip (the lower end) of the heater 51 may be maintained at a given distance from the lower end 41b of the filtration tube 41.

In the state that the heating unit 50 is fixed to the filtration unit 40 and the filtration tube 41, the inserted heater 51 heats the filtration tube 41. In this state, the ratio of the inserted length a of the heater 51 in the filtration tube 41 to the longitudinal length A of the filtration tube 41 (a/A, see FIG. 9) may be the same or different among the plurality of filtration tubes 41. The a/A is preferably 0.2 or greater to sufficiently heat the filtration tube 41 and 0.99 smaller to allow for smooth insertion into the filtration tube 41. The a/A is more preferably 0.7 to 0.99.

Figure 10:
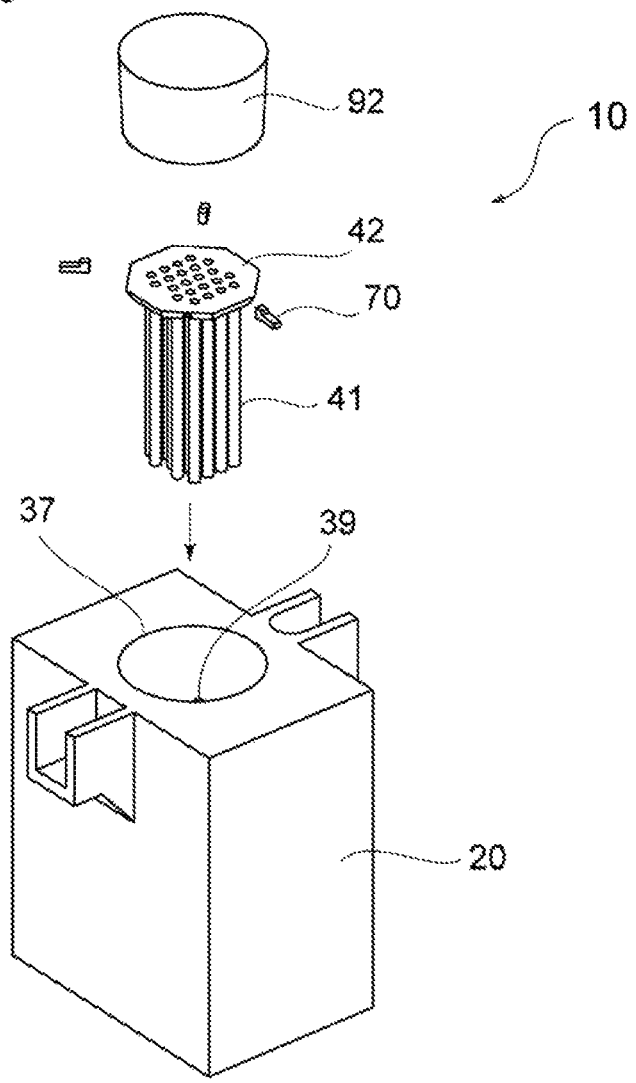
FIG. 10 is equivalent to FIG. 1, illustrating the apparatus 10 of which a first closure 52 is replaced with a second closure 92.
Figure 11:
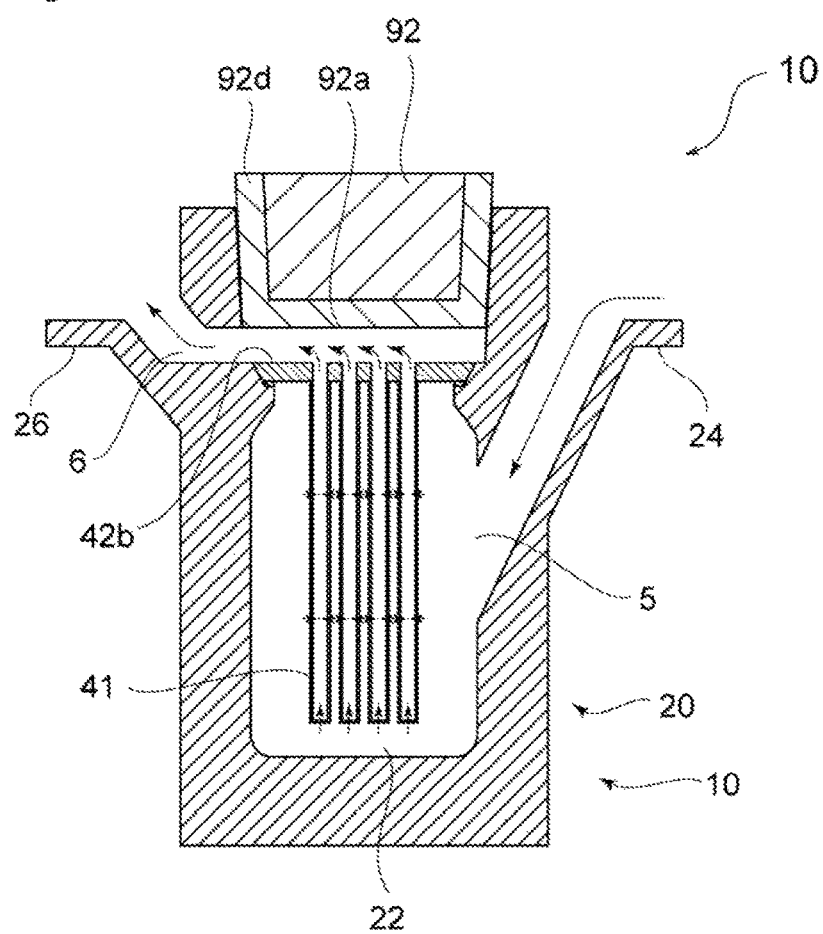
FIG. 11 is equivalent to FIG. 9, illustrating the apparatus 10 of which a first closure 52 is replaced with a second closure 92.

An embodiment in which the filtration apparatus 10 does not have the heating unit 50 fitted therein will next be illustrated. In FIGS. 10 and 11, the housing opening 9 is closed by a second closure 92 in place of the support 52 having the heaters 51 fixed therethrough.

As illustrated in FIGS. 10 and 11, the second closure 92 has almost the same contour as the first closure 52 but has no through-hole 52d for fixing the heater 51. That is, the second closure 92 is not configures to support the heater 51. Accordingly, the filtration apparatus 10 is configured to have its housing opening 9 closed by the second closure 92 with no heater 51 inserted into the filtration tube 41.

The second closure 92 is preferably made of a shaped or unshaped refractory material having low reactivity with molten metal. In treating molten metal containing aluminum or an aluminum alloy, the second closure 92 is preferably made of a material containing a silicon nitride-bonded silicon carbide refractory material, a silicon nitride refractory material, an alumina refractory material, a zirconia refractory material, and so forth. In that case, the outer surface of the second closure 92 may be covered with a metallic casing. As illustrated in FIG. 11, the second closure 92 has packing 92d covering the lateral and lower surface thereof. The packing 92d can contain alumina fiber and provides a liquid-tight seal between the housing 20 and the second closure 92. The seal is achieved by the self-weight of the second closure 92. Packing containing alumina fiber similar to the packing 92d may be applied to the first closure 52.

As illustrated in FIGS. 9 and 11, both the first closure 52 and the second closure 92 fitted in to block the housing opening 9 have their lower surface located above the second main surface (upper surface) 42b of the support plate 42 of the filtration unit 40 at a certain distance. The lower surface of the closures 52 and 92 is almost even with the upper surface of the molten metal outlet 6. During molten metal filtration operation, the level of the molten metal in the housing 20 is substantially even with the lower surface of the closures 52 and 92. Therefore, the surface of the molten metal has a small contact area with oxygen in air and thereby protected from oxidation. In addition, such a configuration of the closures 52 and 92 is effective in preventing air convection above the molten metal surface that would draw heat from the molten metal.

Having the above described structure, the filtration apparatus 10 of the embodiment provides the following advantages. With the heating unit 50 fitted to the filtration tube 41 in the housing 20 to insert the heater 51 into the filtration tube 41, the filtration tube 41 can be heated from the inside. Therefore, the filtration tube 41 and its vicinity can be heated with good efficiency. For example, the filtration tube may be preheated efficiently by fitting the heating unit 50 to the filtration tube 41 before the commencement of molten metal filtration. Consequently, not only is reduced the time required for preheating but, because tube clogging is reduced, the molten metal casting time will be reduced. Since the support 52 of the heating unit 50 also functions as a first closure, it blocks the housing opening 9 to prevent air from drawing heat from the molten metal in the filtration tube 41, the housing 20, and the chamber 3 and to further improve heating efficiency. Moreover, needing fewer parts, the apparatus 10 is produced more easily. Since the heating unit 50 is fixed with respect to the filtration unit 40, the efficiency of the operation of installing a heating mechanism is improved in heating the filtration tube 41.

With a conventional filtration system having the filtration tube 41 fitted horizontally, it is difficult to set the heater insertably into the filtration the 41 as in the filtration apparatus of the invention. If the structure for detachably inserting a heater into the horizontal filtration tube 41 is adopted in a conventional filtration apparatus, the housing opening 9 must be provided on the lateral side of the filtration apparatus, so that, unless the engagement between the housing opening 9 and the closure 52 is securely sealed, leakage of the molten metal would occur. Furthermore, if the filtration tube is set horizontally, is it impossible to detach the heating unit, which also functions as a closure of the opening, from the housing as containing molten metal without leakage of molten metal. Such usage is allowed with the apparatus of the invention having the filtration tube set vertically. Hence, the invention is a technique that is made feasible only by adopting the structure in which the filtration tube is disposed with its longitudinal direction intersecting the horizontal plane.

The filtration apparatus 10 of the embodiment may use either one or both of the first closure 52 and the second closure 92.

In the case when both the first closure 52 and the second closure 92 are used, the apparatus 10 may be operated, for example, as follows. The housing opening 9 is first closed by the first closure 52, and the housing 20 is heated by the heating unit 50 before the commencement of molten metal filtration. Thereafter, the first closure 52 is removed from the housing 20, and the housing opening 9 is then blocked by the second closure 92. According to this usage, molten metal filtration can be accomplished with no heater 51 inserted into the filtration tube 41 while preventing the filtration tube 41 from cooling by the atmosphere. To conduct molten metal filtration with the heating unit 50 removed from the housing 20, i.e., with no heater 51 inserted in the filtration tube 41, is preferred in order to avoid deposition of molten metal to the heater 51 or the support 52, which will facilitate maintenance of the heating unit 50.

A preferred method of molten metal filtration by the use of the apparatus 10 according to the embodiment will be described. The filtration unit 40 is housed in the housing 20. The housing opening 9 is closed and blocked by the first closure 52 thereby to fix the heating unit 50 relative to the filtration tube 41 to provide the state shown in FIG. 9. In this state, the heater 51 inserted in each filtration tube 41 is caused to generate heat thereby to preheat the housing 20 and the filtration tubes 41 to a predetermined temperature. The first closure 52 is then removed from the housing opening 9 to withdraw the heaters 51 from the filtration tubes 41 to provide the state shown in FIGS. 2 and 3. The housing opening 9 is closed by the second closure 92 to provide the state shown in FIG. 11.

In that state, molten metal to be filtered is introduced to the chute 24 and made to flow in the chamber 3 through the inlet 5 as illustrated in FIG. 11. The molten metal in the chamber 3 penetrates from the outside into the inside of the filtration tubes 41. The molten metal having entered the filtration tubes 41 rises in the filtration tubes and flows outside the filtration unit 40 through the opening 43 of the filtration tubes 41 and the openings 44 of the support plate 42 to complete filtration. The filtered molten metal flowing out of the filtration unit 40 flows in the gap between the upper surface 42b of the support plate 42 and the lower surface 92a of the second closure 92, and is discharged from the outlet 6 and led to a next stage as guided by the gutter 26. The molten state of the metal is maintained during the filtration by the heat generated by an unshown housing heater.

In the case when the filtration apparatus 10 of the embodiment uses only the first closure 52, molten metal can be filtered in the same manner as described above, except that the operation is carried out with the housing opening 9 blocked by the first closure 52 and with the heaters 51 inserted in the filtration tubes 41.

In the case when the filtration apparatus 10 of the embodiment uses only the second closure 92, molten metal can be filtered in the same manner as described above, except that the preheating of the filtration tubes 41 and the housing 20 and the filtration of molten metal are performed with the housing opening 9 closed by the second closure 92. In this case, the preheating and the heating of the apparatus during filtration are achieved by a heater (unshown) disposed in the housing 20.

Examples of metal that may be filtered by the use of the filtration apparatus 10 typically include aluminum and aluminum alloys. The filtration apparatus of the invention is also useful to filter other molten metals.

A second and third embodiments of the invention will then be described. In what follows, the description of the second and third embodiments will be confined to the differences from the first embodiment. The structures or members corresponding or similar to those of the first embodiment are identified with the same reference numerals as in the first embodiment and will not be described redundantly except for differences.

A filtration apparatus 110 according to the second embodiment of the invention will be described with reference to FIGS. 12 through 17.

Figure 13:
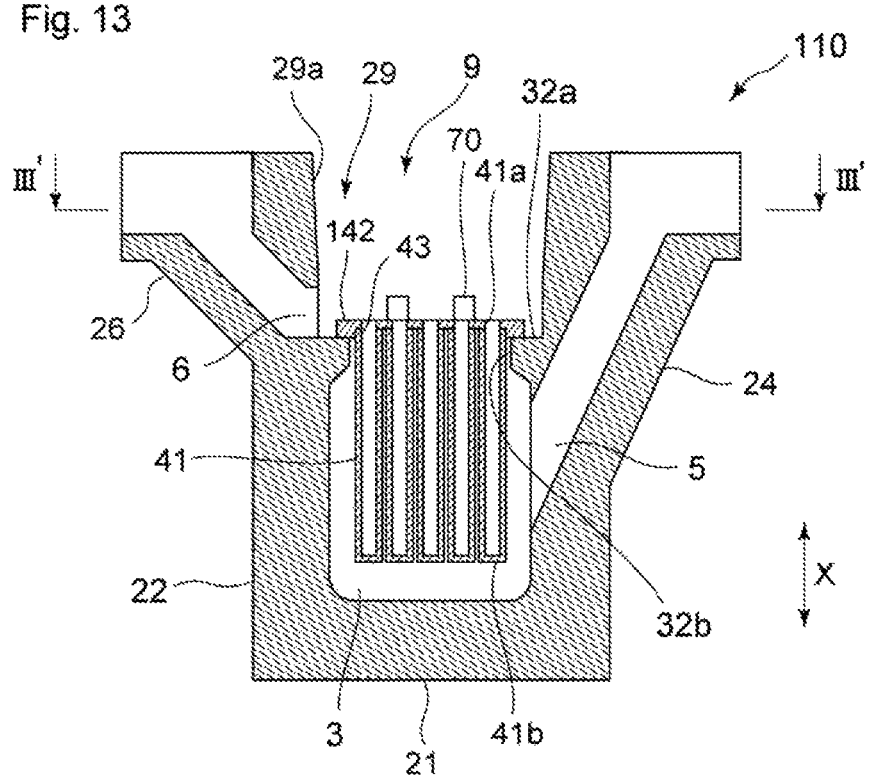
FIG. 13 is a cross-sectional view of the apparatus 110 before fitting a closure (heating unit), taken along line I'-I' of FIG. 12 viewed in the direction of the arrows.

All the edge surfaces 42c of a support plate 142 of this embodiment are substantially flat and vertical to the upper surface 42b unlike the support plate of the first embodiment. As illustrated in FIG. 13, the housing 20 does not have the edge-mating portion 33, which is provided over the whole inner circumference of the housing opening 9 in a complementary fashion to the edge surface of the support plate 42 in the first embodiment. In the present embodiment, the upper surface 32a of the catching portion 30 is substantially even with the lower surface of the outlet 6.

Figure 14:
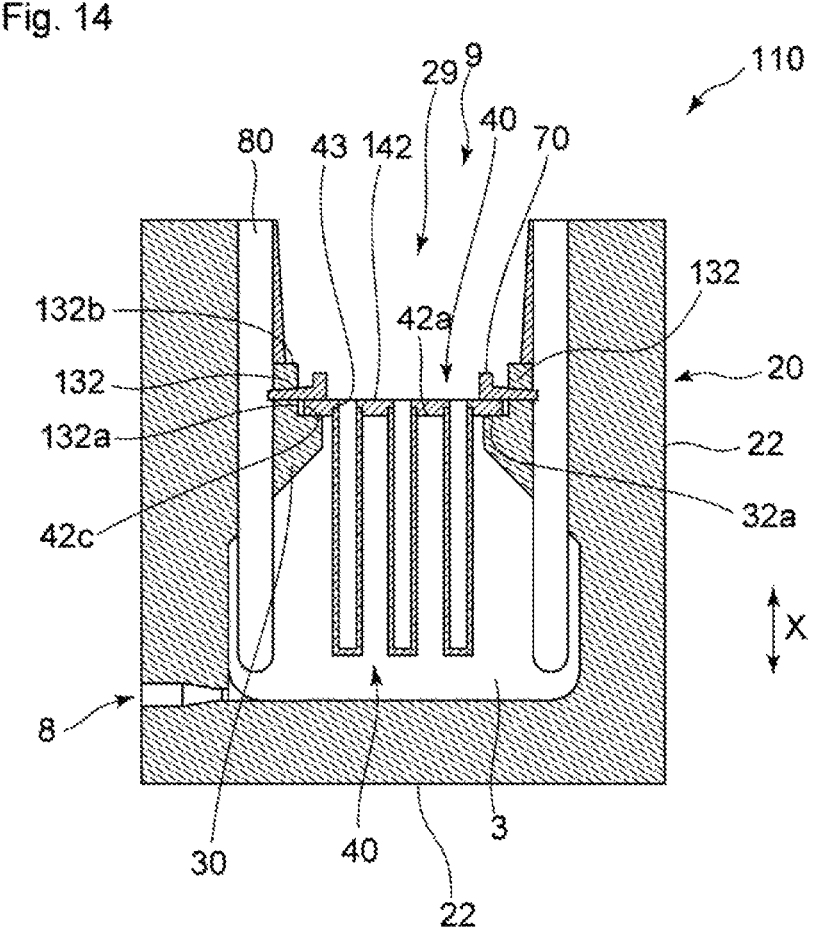
FIG. 14 is a cut-away end view of the apparatus 110 of the same state as in FIG. 13, taken along line II'-II' of FIG. 12 viewed in the direction of the arrows.
Figure 15:
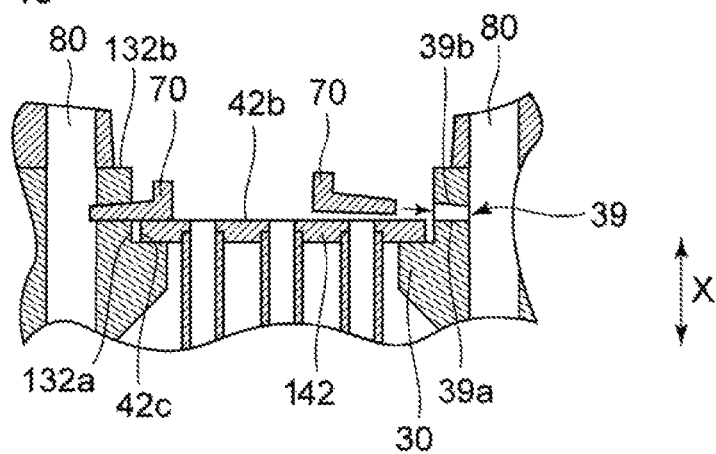
FIG. 15 is a partially enlarged cross-sectional view of FIG. 14, illustrating a housing opening 9 and its vicinity.
Figure 16:
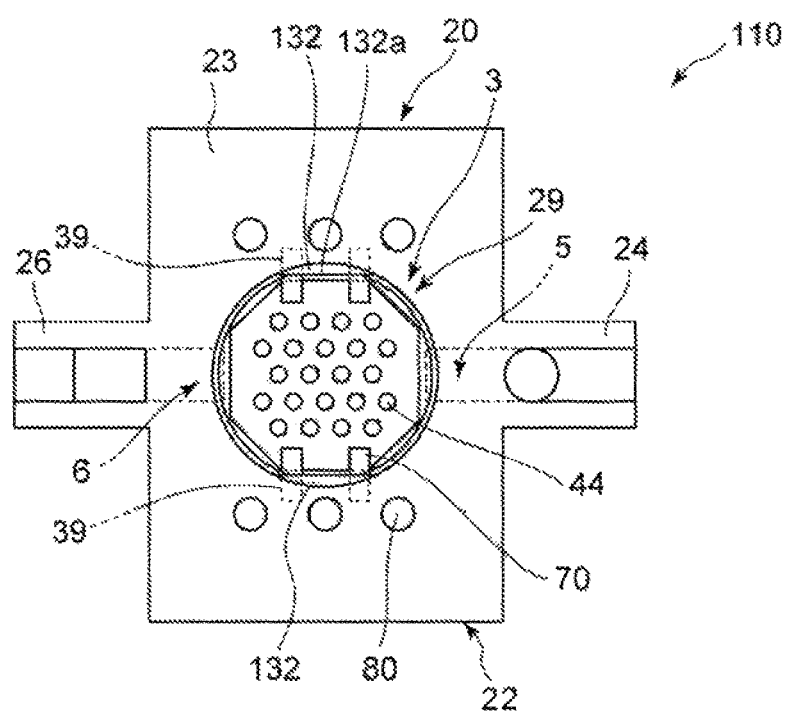
FIG. 16 is a cross-sectional view of the apparatus in the same state as in FIG. 13, taken along line III'-III' of FIG. 13 viewed in the direction of the arrows.

As illustrated in FIGS. 12 and 14 to 16, the housing 20 has a pair of projections 132 which projects horizontally inward above the catching portion 30 from the wall 22 and which faces each other via the housing opening 9. As depicted in FIG. 16, the direction in which the two projections 132 face each other is substantially perpendicular to the direction in which the inlet 5 and the outlet 6 face each other. The projections 132 each have a flat front surface 132a parallel to the depth direction X. The facing front surfaces 132a of the pair of projections 132 are parallel to each other. The projections 132 are provided to inhibit the rotation of the filtration unit 40 fitted in the housing 20.

Figure 12:
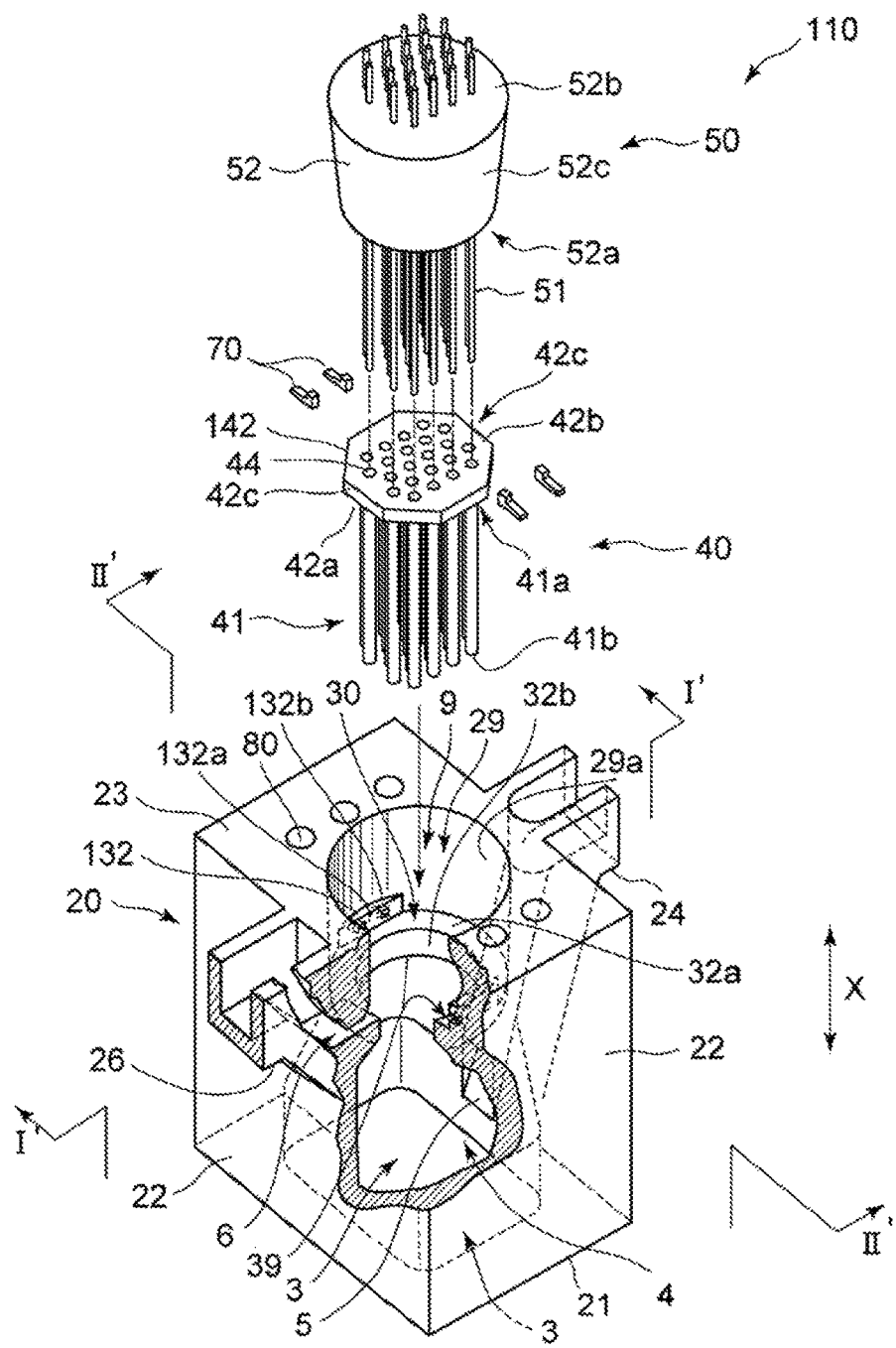
FIG. 12 is an exploded perspective view of a molten metal filtration apparatus 110 according to another embodiment of the invention.

As illustrated in FIGS. 12 and 14, the pair of projections 132 is provided at the lower end of the housing opening 9. Each projection 132 has a flat upper surface 132b parallel to the horizontal plane. When the housing opening 9 is blocked by the first closure 52 of the heating unit 50, the lower surface 52a of the closure 52 abuts against the upper surface 132b of the projections 132.

As illustrated in FIGS. 12 and 16, at least one recess 39, into which the wedge 70 is inserted, is bored on the front surface 132a of each projection 132 in the direction substantially perpendicular to the direction in which the inlet 5 and the outlet 6 face each other in a plan view of the housing 20. The number of the recesses 39 formed on one of the projections 132 is preferably the same as that formed on another projection 132. As illustrated in FIG. 15, in the state that the support plate 142 of the filtration unit 40 is caught by the catching portion 30, the position of the recesses 39 in the depth direction is even with the upper surface (second main surface) 42b of the support plate 142. In the second embodiment the bottom inner surface 39a of the recess 39 is substantially even with the upper surface 42b of the support plate. In the first embodiment the wedge 70 as inserted into the recess 39 contacts the top inner surface of the recess 39 on its upper surface but does not contact the bottom inner surface of the recess 39 on its lower surface. In the second embodiment, in contrast, the wedge 70 as inserted into the recess 39 contact both the top and bottom inner surfaces of each recess 39 on its upper and lower surfaces. In assembling the filtration apparatus of this embodiment, when the filtration unit 40 is moved down in the housing 20 until the first main surface 42a of the support plate 142 comes into contact with the upper surface 30a of the catching portion 30, the support plate 142 is fitted into the upper surface 30a of the catching portion 30 in such a manner that opposite edge surfaces 42c thereof, which are parallel to each other, may face the front surface 132a of the two opposite projections 132 of the housing 20 as shown in FIGS. 14 and 15. The wedge 70 is then inserted into each recess 39 formed in the projections 132, whereby the support plate 142 is fixedly held under pressure between the wedges 70 inserted into the recesses 39 and the catching portion 30.

The filtration apparatus 110 of the second embodiment produces the same effects as by the apparatus of the first embodiment, i.e., the filtration unit is easy to seal, lifting of the support plate and a resulting leakage of molten metal are prevented effectively, and yet the apparatus is simple and easy to maintain.

Figure 17:
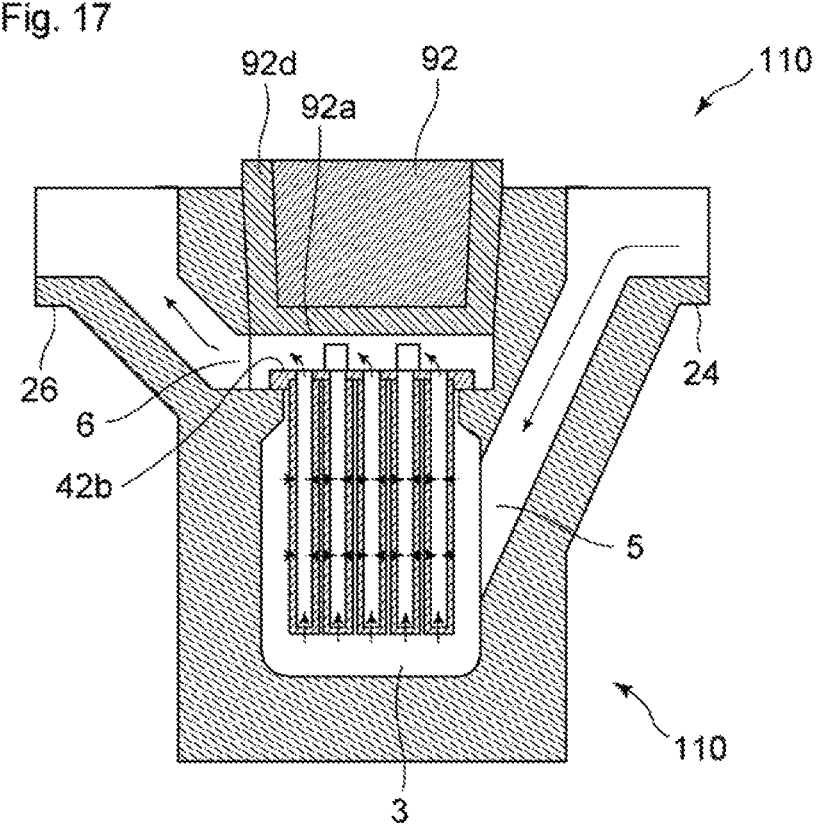
FIG. 17 is equivalent to FIG. 13, illustrating the apparatus fitted with a second closure.

In the case when the housing 20 is provided with a heater separate from the heating unit 50, the heater may have the structure of housing heaters 80 illustrated in FIGS. 12 and 14 to 16. The housing heaters 80 each have a rod shape and are arranged with their longitudinal direction coincident with the depth direction X of the housing 20. As illustrated in FIG. 16, a plurality of housing heaters 80 are disposed on opposite sides of the housing opening 9 in a plan view of the filtration apparatus 110. The mutually facing direction of a pair of heaters 80 on opposite sides of the opening 9 is substantially perpendicular to the mutually facing direction of the inlet 5 and the outlet 6. As illustrated in FIG. 14, each heater 80 has its upper portion going through the wall 22 and fixed to the wall 22 while having its lower portion exposed in the chamber 3. The so arranged heaters 80 make it possible to maintain the filtration tubes 41 and the housing 20 during a filtration operation at a predetermined temperature even when the filtration is carried out with the heating unit 50 removed from the filtration tubes 41 as shown in FIG. 17. The housing heaters 80 may be used to preheat the apparatus before introducing molten metal similarly to the heating unit 50. The heaters 80 are omitted in FIGS. 13 and 17.

As illustrated in FIGS. 12 through 17, the second embodiment is further different from the first one in that packing is not provided between the catching portion 30 and the support plate 142, that the housing 20 has no grooves, and that the support plate 142 does not have a hook-engageable cut.

A filtration apparatus 110A according to the third embodiment of the invention will be described with reference to FIGS. 18 to 21.

In the third embodiment, the combination of the wedge 70 and the recess 39 as a hold-down member is replaced with a combination of a rod member 77 and an urging member 75.

Figure 18:
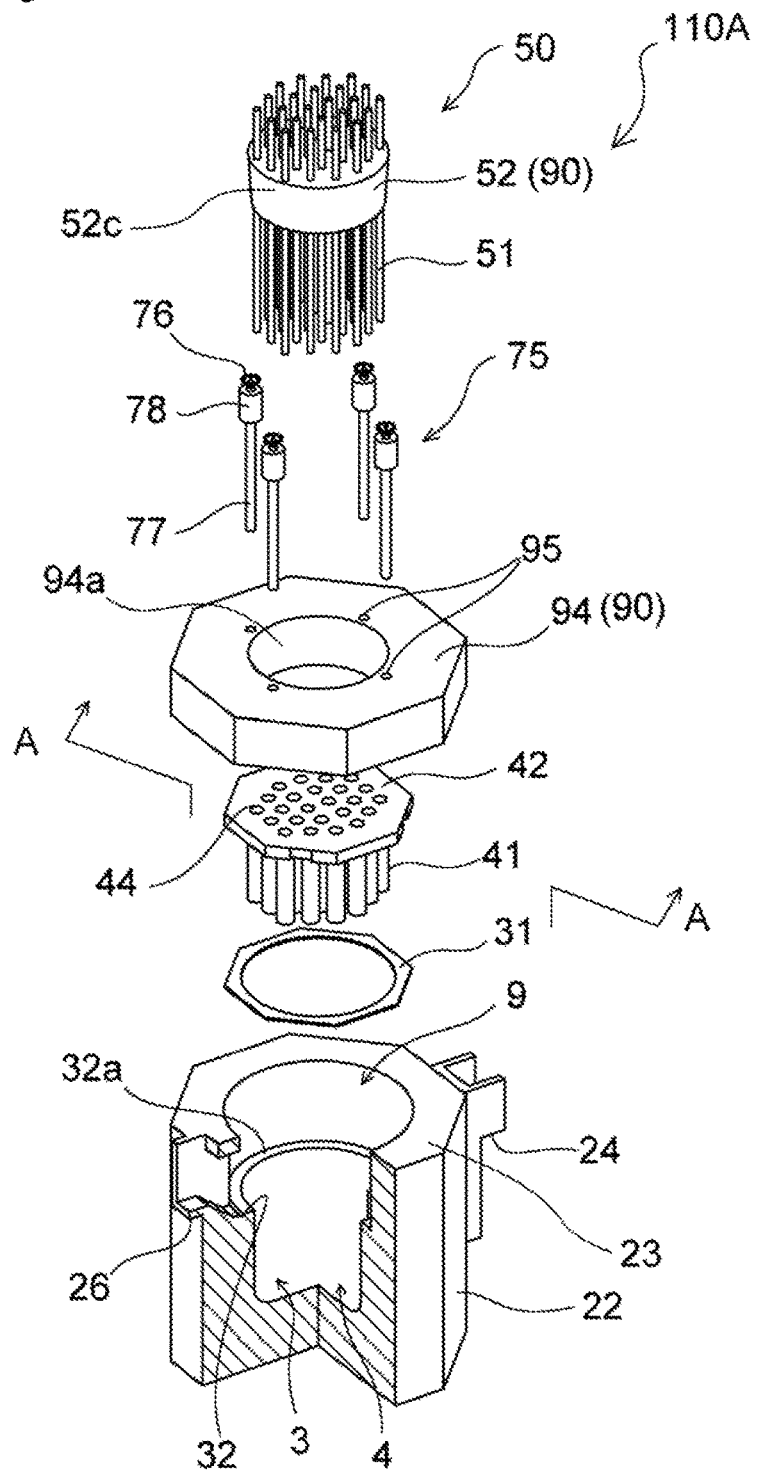
FIG. 18 is an exploded perspective view of a filtration apparatus 110A according to still another embodiment of the invention.
Figure 19:
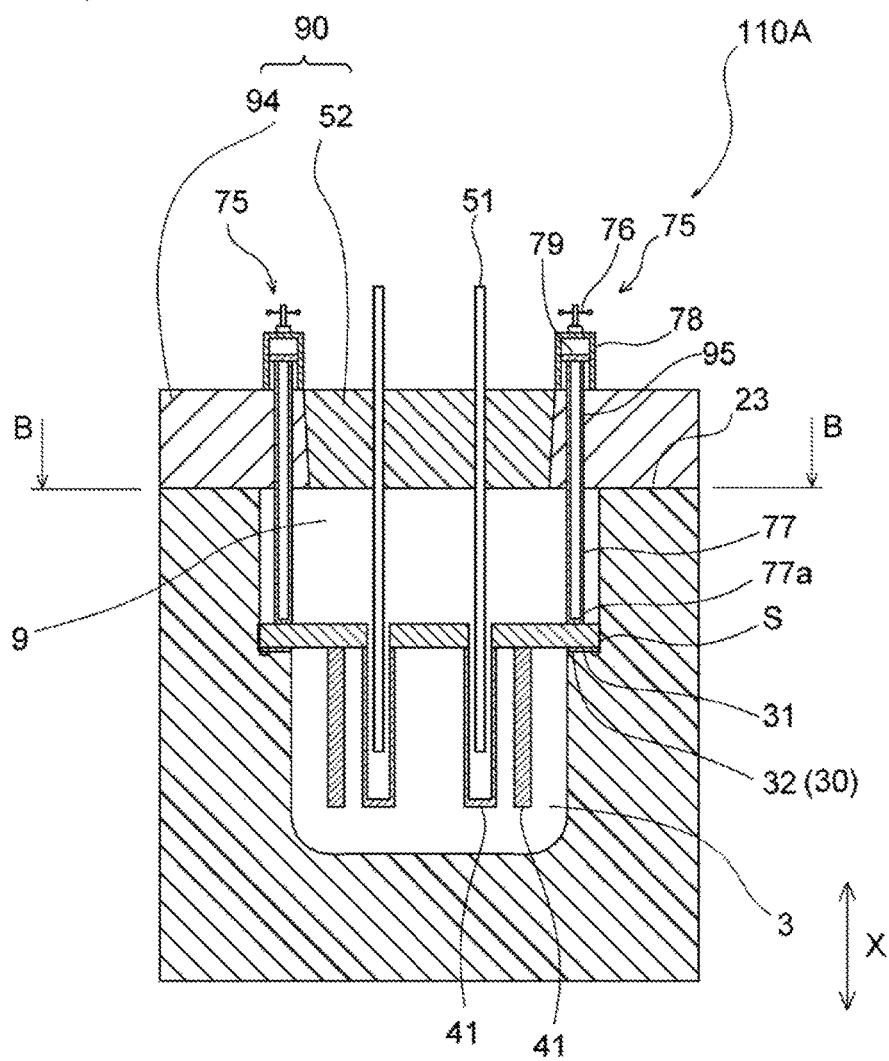
FIG. 19 is a cross-sectional view of the apparatus 110A fitted with a heating unit, taken along line A-A of FIG. 18.

As illustrated in FIGS. 18 and 19, the opening 9 of the housing 20 is detachably closed by a plate-shaped closure 90 that covers the top 23 of the housing 20. The closure 90 is separably composed of a central portion 52 and a peripheral portion 84. The central portion 52 is located to cover the filtration tubes 41 in a plan view of the apparatus 110A, and the peripheral portion 94 surrounds the central portion 52 in a plan view. In the particular example shown in FIGS. 18 and 19, the central portion 52 is the same as the support 52 of the heating unit 50. In the example shown in FIG. 19, the central portion 52 has a substantially uniform thickness, and the peripheral portion 94 also has a substantially uniform thickness. The thickness of the central portion 52 and that of the peripheral portion 94 are substantially equal but may be different. The inner periphery 94a of the peripheral portion 94 and the outer periphery 52c of the central portion 52 are complementary to each other. In order to prevent the central portion 52 from falling off the peripheral portion 94, the outer periphery 52c of the central portion 52 and the inner periphery 94a of the peripheral portion 94 may be tapered and reverse-tapered, respectively, downward in the depth direction X.

The closure 90 has a larger plan view area than the housing opening 9 and covers the entirety of the housing opening 9. When the closure 90 is placed on the top 23 of the housing 20, the closure 90 closes the housing opening 9. The central portion 52 has a plan view area that is smaller than that of the 52 housing opening 9 and is located entirely inside the housing opening 9 in a plan view.

As illustrated in FIGS. 18 and 19, the closure 90 has a through-hole 95 in the peripheral portion 94. At least two, preferably 3 or more, through-holes 95 are provided along the inner circumference of the peripheral portion 94. The direction that each through-hole 95 penetrates the closure 90 is the thickness direction of the closure 90. The thickness direction of the closure 90 as closing the housing 20 is substantially coincident with the depth direction X of the housing 20. The apparatus 110A has rod members 77 which are inserted in the through-holes 95, and the rod members 77 are inserted in the through-holes 95 on a one-to-one basis. The plurality of rod members 77 have substantially the same length. Each rod member 77 as inserted in the through-hole 95 of the closure 90 is located in the peripheral portion 94 with its longitudinal direction coincident with the depth direction X and is slidable in the through-hole 95 in the depth direction X. The urging member 75 is connected to each rod 77 and disposed on the upper surface of the peripheral portion 94. The urging member 75 has a cylinder 78 fixed to the upper surface of the peripheral portion 94 by means of, for example, an unshown jig and an unshown screw.

The rod member 77 may be either solid or hollow. In using a hollow rod member 77, the lower end 77a of the rod member 77, which contacts the support plate 42, is preferably closed as illustrated in FIG. 19 so as to prevent molten metal from entering the hollow inside of the rod 77. In the example shown in FIG. 19, while the rod member 77 has an unchanged cross-sectional shape taken in the direction perpendicular to its longitudinal direction over the whole length thereof, the shape of the rod member 77 is not limited thereto. The rod member 77 may be provided, at its lower end 77a, with a hold-down member whose cross-sectional shape differs from that of the rod member 77. The material making up the rod member 77 may be, for example, silicon nitride when the metal to be filtered is aluminum.

The urging member 75 is preferably configured to apply an adjusted and fixed urging force against the rod member 77. Specific examples of such an urging member include a hydraulic cylinder, an air cylinder, a position-controllable motor, e.g., a stepping motor, and a manually operable screw. When a motor is used as the urging member 75, the rod member 77 may be a ball screw. With these urging members, the hold-down force against the support plate 42 is easily adjustable, and by using a plurality of urging members, it is easy to uniformly hold down the peripheral edge portion S of the support plate 42.

The urging member 75 used in the example illustrated in FIG. 19 is a hydraulic cylinder. The hydraulic cylinder 75 includes a handle 76, a cylinder 78, and a piston 79 in the cylinder 78. The rod member 77 is connected to the piston 79. The handle 76 is operated manually or automatically to feed oil into the cylinder 78 through an unshown pipe, whereby the piston 79 moves downward in the depth direction X to urge the rod member 77 in that direction.

As illustrated in FIGS. 18 and 19, the rod members 77 hold down part of the peripheral edge portion S of the support plate 42 that is mounted on the projection 32 (the catching portion 30), whereby the support plate 42 is fixedly held under pressure between the rod members 77 urged by the urging members 75 and the catching portion 30. The support plate 42 is thus effectively prevented from being lifted at the start of a filtration operation similarly to the embodiment in which a wedge 70 is used as a hold-down member.

As illustrated in FIG. 19, the projection 32 is projecting inwardly of the housing 20 over the whole depth and inner periphery of the chamber 3. Therefore, the projection 32 has high strength.

Figure 20:
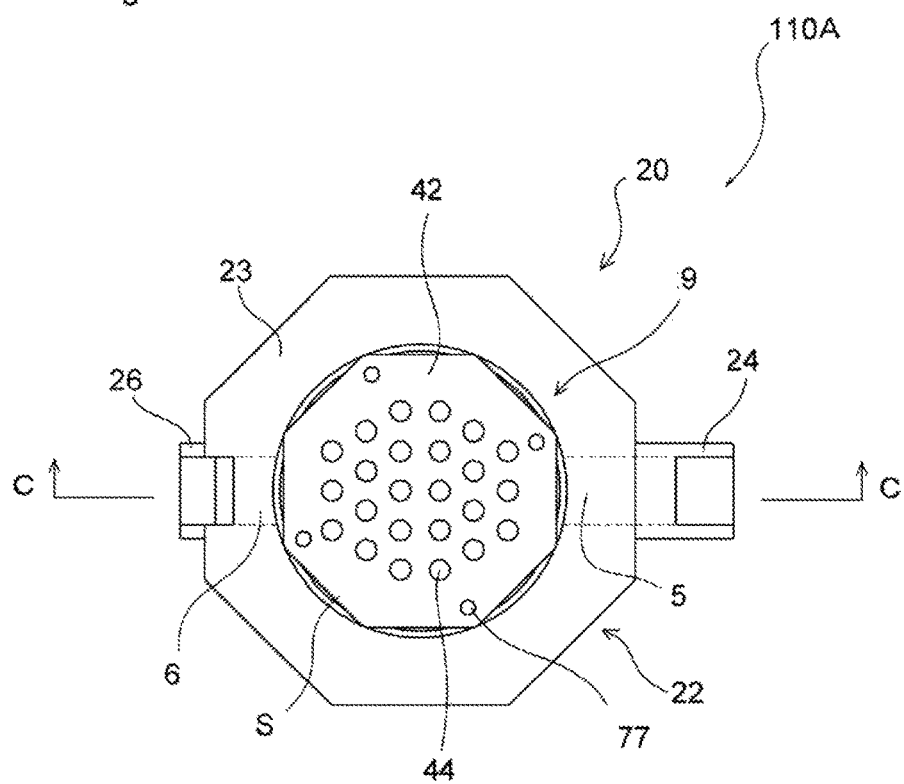
FIG. 20 is a cross-sectional view of the apparatus 110A before being fitted with the heating unit, taken along line B-B of FIG. 19.

FIG. 20 is a plan view of the housing 20 from which the central portion is removed. As illustrated, in the case when the support plate 42 has a polygonal plan view shape, the sites of the support plate 42 to be held down by the rod members 77 are located on a diagonal of the polygon provided that the sites are closer to the periphery of the polygon than the positions of fixing the filtration tubes 41. This arrangement is favorable in terms of preventing imbalanced location of the hold-down sites and fixing the support plate 42 under uniformly applied force thereby to provide a more perfect seal. It is particularly preferred for the sites to be held down are located on the diagonals dividing the area of the support plate 42 into equal halves. As illustrated in FIG. 20, it is preferred for preventing the lift of the support plate 42 that the site to be held down by the rod member 77 not be located on a straight line connecting the inlet 5 and the outlet 6.

The structural material of the closure 90 is the same as described with respect to the first embodiment. Although the lift of the closure 90 while being urged by the hold-down member is usually prevented by its own weight, a member for fixing the closure 90 to the housing 20 may be provided as will be described later.

FIG. 21 presents a cross-section of the apparatus 110A taken along a different direction from FIG. 19. As illustrated in FIG. 21, there is a space between the upper surface 42b of the support plate 42 and the lower surface 90a of the closure 90. The position of the outlet 6 in the depth direction X is such that the upper surface 42b of the support plate 42 is located between the upper end 6a and the lower end 6b of the outlet 6. As illustrated in FIG. 21, the upper end 6a of the outlet 6 is located below the lower surface 90a of the closure 90. Therefore, molten metal having been filtered is unlikely to adhere to the lower surface 90a of the closure 90 and is therefore prevented from entering the through-hole 95 of the closure 90 and the hereinafter described through-hole 58.

In the third embodiment, since the closure 90 is separably composed of the central portion 52 and the peripheral portion 94, the first closure 52 having the heaters 51 is easily replaced with the second closure 92 with no need to remove the urging members 75 from the closure 90. Further, the inside of the housing 20 may be cleaned without replacement of the filtration unit 40 by removing only the central portion 52 with no need to remove the urging members 75 from the closure. If needed, the central portion 52 may be replaced with a central portion 92 having no heaters. The central portion 92 has a through-hole 58 and a hot air generator 99 that is located on the upper surface side of the central portion 92 in an interconnected relation to the through-hole 58 as illustrated in FIG. 21. According to this configuration, hot air generated by the hot air generator 99 may be supplied to the inside of the housing 20 through the through-hole 58 during filtration operation.

As described above, similarly to the apparatuses of the foregoing embodiments, the filtration apparatus 110A of the third embodiment effectively prevents the lift of the support plate 42 that would occur when molten metal is filtered through a filtration tube 41 the open end of which faces upward. The third embodiment offers an additional advantage in that efforts such as masonry work for forming the recess 39 are not required, which also saves the physical effort of removing the metal deposited on the recess 39. Removal of the metal deposited on the rod member 77 is easily achieved by previously coating the rod member 77 with the same coating as described with respect to the first embodiment.

Figure 23A:
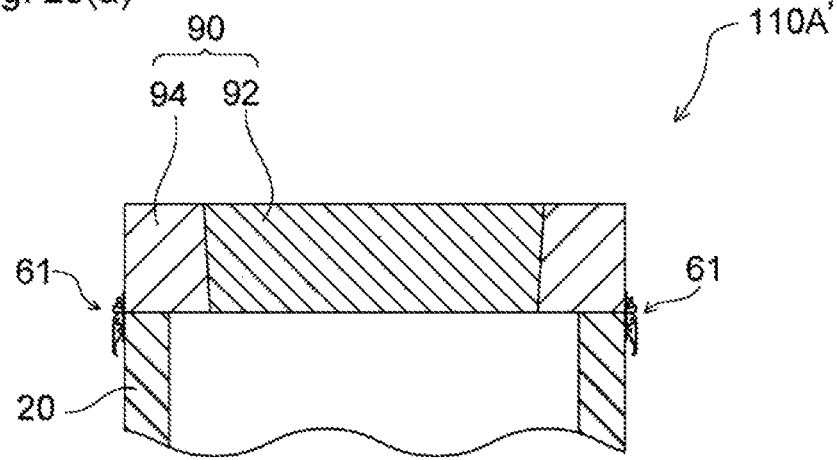
Figure 23B:
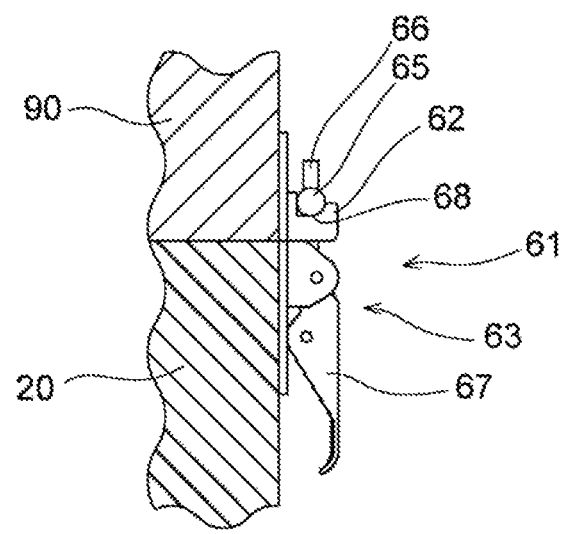
Figure 24:
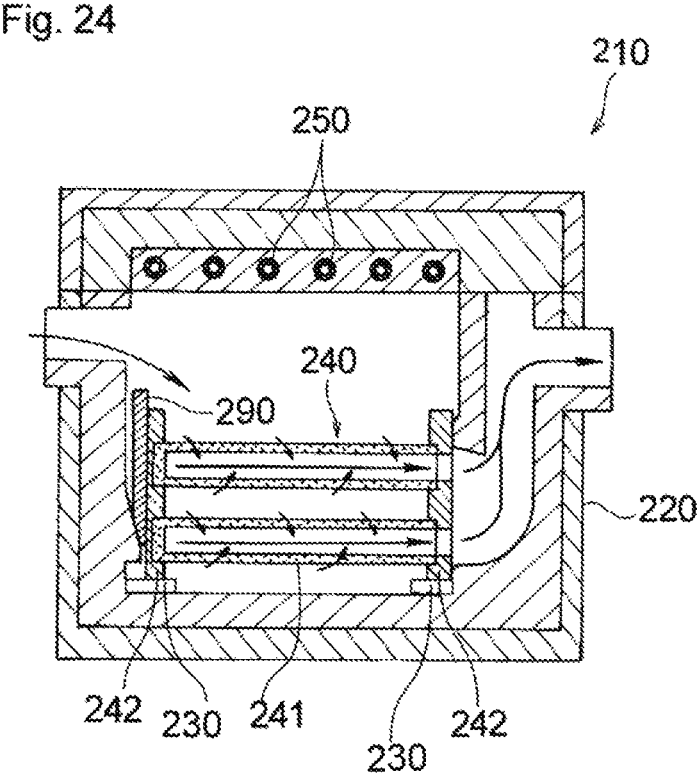
FIG. 24 is a cross-sectional view illustrating the structure of a conventional molten metal filtration apparatus 210.

While the above described apparatus 110A has no member for securing the closure 90 to the housing 20, a fixing member 61 may be used to secure the closure 90 to the housing 20 as illustrated in FIGS. 22 and 23. The apparatus 110A' shown in FIGS. 22 and 23 is the same as the apparatus 110A except that the apparatus 110A' has the fixing member 61. To provide the fixing member 61 further ensures prevention of the closure 90 from being lifted when the closure 90 is urged by the urging members 75. The fixing member 61 is exemplified by a fastener 61 illustrated in FIG. 23. The fastener 61 includes a hook 62 having a concavity 68 and an engageable member 63 engageable with the hook 62. The hook 62 is attached to the lower end of the exterior surface of the closure 90 by means of, e.g., an unshown screw and nut system, while the engageable member 63 is attached to the upper end of the exterior surface of the housing 20 at a position opposite to the hook 62 by an unshown screw and nut system. The engageable member 63 has a rod 66 having a projection 65 on either side thereof and a lever 67 connected to the rod 66. Upon pivoting the lever 67 with the projections 65 fitted into the concavity 68 of the hook 62, the closure 90 is fastened to the housing 20. Preferred examples of such a fastener include Adjust Fastener® C-236 available from Takigen Manufacturing Co., Ltd.

In the example shown in FIG. 22, a plurality of the fasteners 61 (engageable members 63) are provided along the outer circumferential direction of the wall 22. The plurality of, preferably three or more, fasteners are preferably provided in the circumferential direction at a substantially regular interval.

While the invention has been described on the basis of its preferred embodiments, the invention is not limited to these embodiments. For instance, while the recess 39 adopted in the first and the second embodiment has a tapered shape similarly to the wedge 70, the shape of the recess 39 is not limited thereto. For example, the dimension of the recess 39 in the depth direction X may be substantially constant in the horizontal direction. The filtration apparatus does not always need to have as many wedges 70 as the recesses 39.

While in the first and the second embodiment the plurality of recesses 39 have the same shape, and the plurality of wedges 70 have the same shape, they may have different shapes. The plurality of wedges 70 may be made of different materials.

While in the foregoing embodiments the catching portion 30 (the projection 32) is continuous in the inner circumferential direction of the housing opening 9, it may be discontinuous in that direction. The catching portion 30 (the projection 32) does not need to be integral with the housing 20.

The support plate 42 does not need to have a generally polygonal plan view shape and may have a generally circular shape.

The support plate 42, when viewed from its side, does not need to have a fittable configuration to be fitted in along the direction from the side of its upper surface 42b toward the side of its lower surface 2a. In that case, it is preferred that the support plate 42 not be tapered from the side of the lower surface 42a toward the side of the upper surface 42b when viewed in every direction perpendicular to the depth direction X.

The filtration apparatus does not need to have a heating unit. For example, the apparatus may have the second closure 92 instead of the first closure 52.

The shapes of the closure and the housing opening (closure-receiving portion) of the apparatus 10 are not limited to those described above and may be any possible shape. For example, the closure and the housing opening may have a polygonal plan view shape, and their mating surfaces do not need to be tapered or may be shouldered instead of being tapered.

While in the foregoing embodiments the filtration tube 41 is fixed with its longitudinal direction coincident with the depth direction X of the housing, the longitudinal direction of the tube 41 does not always need to be coincident with the depth direction X provided that it intersects the horizontal plane. Specifically, the angle formed between the longitudinal direction of the filtration tube 41 and the horizontal plane is preferably at least 45°, more preferably 55° or greater, even more preferably 80° or greater.

In the cases where the filtration apparatus has a heating unit, for example, in the foregoing embodiments, in which the filtration unit 40 has at least one filtration tube 41, the number of the heaters 51 of the heating unit 50 is enough to heat a part or all of the filtration tubes 41 so that the heater 51 is inserted into a part or all of the filtration tubes 41. The number of the filtration tubes 41 may be one or more, and the number of the heaters 51 may be one or more.

The number of the heaters 51 does not need to be equal to that of the filtration tubes 41 and may be smaller than that of the filtration tubes 41. When there are two or more filtration tubes 41, it is only necessary that at least one of them have the heater inserted therein. Not all the filtration tubes 41 need to have the heater inserted therein.

There needs not be a one-for-one relationship between the filtration tube 41 and the heater 51. For example, a plurality of heaters 51 may be inserted into one filtration tube 41. The through-hole 52d and the heater 51 do not need to be in a one-for-one relationship, either. That is, a plurality of heaters 51 may be inserted through one through-hole 52d. The number of the through-holes 52d does not need to be equal to that of the filtration tubes 41. For example, the number of the through-holes 52d may be smaller than that of the filtration tubes 41. Note that the number of the filtration tubes 41 should be equal to that of the openings 43.

While in the foregoing embodiments the plurality of heaters 51 are of the same shape and material, they may be of different shapes and materials.

While the shape of the heater 51 is a rod in the foregoing embodiments, the shape of the heater is not limited thereto. For example, the rod-shaped heater may be replaced with a spiral heater.

The manner of fixing the heater to the support is not limited to passing the heater through the through-hole as in the foregoing embodiments. For example, the heater may be fixed to the lower surface of the support by disposing a hold-down member on the lower surface of the support.

The support 52 of the heating unit does not need to perform the function as a closure for blocking the housing opening 9. For example, the housing 20 may have a catching portion for catching the support 52 and may be closed by a separate closure from the support.

While in the foregoing embodiments, the support 52 and the inner surface of the wall 22 are tapered in a complementary fashion, so that the support 52 is configured to be fittable in the housing 20, the fittable configuration of the support 52 in the housing 20 is not limited thereto. For example, the support 52 may have a shoulder on its edge surface, and the inside of the wall 22 may have a complementary shoulder so that they are fitted to each other, whereby the support 52 may be fitted in the housing 20.

REFERENCE SIGNS LIST

10 Molten metal filtration apparatus
20 Housing
21 Bottom
22 Wall
9 Housing opening
30 Catching portion
39 Recess
40 Filtration unit
41 Filtration tube
43 Opening of filtration tube
42 Support plate
42a Lower surface
42b Upper surface
42c Edge surface
50 Heating unit
51 Heater
52 Support
52a Lower surface
52b Upper surface
52c Lateral surface
70 Wedge
75 Urging member
77 Rod member
90 Closure
92 Second closure

The invention claimed is:
1. A molten metal filtration apparatus, comprising:
a housing that includes a molten metal chamber, and an upper portion that has an opening; and
a filtration unit detachably fitted in the molten metal chamber of the housing,
the filtration unit including a support plate, and at least one bottomed cylindrical filtration tube, said filtration tube formed of a porous ceramic material and being fixed to the support plate along a thickness direction of the support plate, said filtration tube being configured in such a manner that when fitted in the housing, a longitudinal direction of the filtration tube intersects a horizontal direction of the housing and an open end of the filtration tube faces upward, the housing having, on an inner wall of the housing, a catching portion for fitting the support plate therein, the catching portion projecting horizontally inward from the inner wall, wherein the apparatus further comprises a hold-down member that holds down the support plate from an upper surface side toward a lower surface side of the support plate at a location closer to a periphery of the support plate than a location at which the filtration tube is fixed, wherein the inner wall of the housing has a plurality of recesses on the same level in a depth direction of the housing as an upper surface of the support plate fitted on the catching portion, a plurality of the recesses each extending horizontally outward from the surface of the inner wall, and wherein the hold-down member is a wedge insertable into the recess, wherein the catching portion and the wedge inserted into the recess are configured to hold the support plate therebetween under pressure, the recess having a bottom inner surface along a horizontal plane of the housing, the bottom inner surface being positioned lower than the upper surface of the support plate fitted on the catching portion, and the support plate having a hook-engageable cut which is engageable to a hook member which is a fitting tool for fitting the filtration unit into the housing.

2. The molten metal filtration apparatus according to claim 1, wherein the support plate, as viewed from a side, has a fittable configuration to be fitted in along a direction from an opening toward a lower end of the filtration tube, and
the inner wall of the housing above the catching portion is shaped to be complementary to an edge profile of the support plate.

3. The molten metal filtration apparatus according to claim 1, wherein the catching portion extends along an entire inner circumference of the opening of the housing, and the housing and the catching portion are an integrally formed ceramic body.

4. The molten metal filtration apparatus according to claim 1, the hook-engageable cut is formed by boring a part of a peripheral portion of the support plate except a part containing the upper surface of the support plate.

5. The molten metal filtration apparatus according to claim 1,
wherein the housing has an inlet through which molten metal to be filtered is poured and an outlet through which filtered molten metal is discharged,
the inlet and the outlet are opposite to each other with respect to the molten metal chamber in a plan view of the housing, and at least one of the recesses of the inner wall extends in a direction perpendicular to a mutually facing direction of the inlet and the outlet.

6. The molten metal filtration apparatus according to claim 1, wherein the housing has an inlet through which molten metal to be filtered is poured and an outlet through which filtered molten metal is discharged,
with the filtration unit fitted to the chamber of the housing and with the support plate of the filtration unit being caught by the catching portion of the inner wall of the housing, the inlet leads to the chamber, and the outlet leads to the opening of the filtration tube.

7. The molten metal filtration apparatus according to claim 1, further comprising:
a heating unit detachably fitted to the filtration unit,
the heating unit including a support and at least one heater fixed to the support, and
the heater being fixed to the support so as to be inserted into the filtration tube.

8. The molten metal filtration apparatus according to claim 7, wherein the support of the heating unit has a first closure configured to fit in the opening of the housing and to block the opening.

9. The molten metal filtration apparatus according to claim 7, wherein, with the support of the heating unit fitted in the opening of the housing, the heating unit is fixed with respect to the filtration unit.

10. The molten metal filtration apparatus according to claim 8,
wherein the support of the heating unit as fitted to the filtration unit has a width that decreases downward in the depth direction of the housing when viewed from at least one horizontal direction, and
wherein the opening of the housing is complementary to an edge surface of the support of the heating unit.

11. The molten metal filtration apparatus according to claim 7, wherein the heating unit is adapted to be fitted to the filtration unit before a commencement of molten metal filtration.

12. The molten metal filtration apparatus according to claim 8, further comprising:
a second closure capable of blocking the opening of the housing instead of the first closure and is configured in such a manner that, with the opening of the housing blocked by the second closure, the heater is not inserted in the ceramic filtration tube of the filtration unit.

13. The molten metal filtration apparatus according to claim 7, wherein the heating unit has at least as many heaters as the filtration tubes, and the heaters are arranged so that every filtration tube has the heater inserted.

14. The molten metal filtration apparatus according to claim 7, wherein the heater has a constant rod shape.

15. The molten metal filtration apparatus according to claim 7, wherein:
the filtration unit is configured to be housed in the housing in such a manner that a longitudinal direction of the filtration tube is substantially coincident with the depth direction of the housing,
the support of the heating unit as fitted to the filtration unit has a lower surface facing downward in the depth direction of the housing and an upper surface facing opposite to the lower surface,
the heater has a rod shape and is fixed in such a manner that the longitudinal direction of the heater is substantially perpendicular to the upper surface of the support of the heating unit, and
the support of the heating unit is configured in such a manner that the heating unit is fitted to the filtration unit by lowering the support in the depth direction with its upper surface substantially perpendicular to the depth direction of the housing.

* * * * *